US012594798B2

(12) United States Patent
Williams

(10) Patent No.: US 12,594,798 B2
(45) Date of Patent: Apr. 7, 2026

(54) ROAD TO RAIL HYBRID VEHICLES USING PASSIVE JUNCTION AND TRANSITION SPANS

(71) Applicant: Thomas Holtzman Williams, Longmont, CO (US)

(72) Inventor: Thomas Holtzman Williams, Longmont, CO (US)

( * ) Notice: Subject to any disclaimer, the term of this patent is extended or adjusted under 35 U.S.C. 154(b) by 52 days.

(21) Appl. No.: 18/924,951

(22) Filed: Oct. 23, 2024

(65) Prior Publication Data

US 2025/0135815 A1 May 1, 2025

Related U.S. Application Data

(63) Continuation-in-part of application No. 18/383,894, filed on Oct. 25, 2023.

(51) Int. Cl.
B60F 1/04 (2006.01)
B60F 1/00 (2006.01)
B60F 1/02 (2006.01)

(52) U.S. Cl.
CPC .............. B60F 1/04 (2013.01); B60F 1/005 (2013.01); B60F 1/02 (2013.01); B60F 1/043 (2013.01); B60F 2301/04 (2013.01); B60F 2301/10 (2013.01)

(58) Field of Classification Search
CPC .... B60F 1/02; B60F 1/04; B60F 1/005; B60F 2301/10; B60F 2301/02; B60F 1/00; B62D 1/265; E01B 25/28; E01B 25/00; B61B 15/00
See application file for complete search history.

(56) References Cited

U.S. PATENT DOCUMENTS

| | | | | | |
|---|---|---|---|---|---|
| 2,088,522 | A | * | 7/1937 | Klima | B60F 1/04 105/72.2 |
| 2,140,421 | A | * | 12/1938 | Fageol | B60F 1/005 105/72.2 |
| 2,162,351 | A | * | 6/1939 | Main | B60F 1/02 105/215.2 |

(Continued)

FOREIGN PATENT DOCUMENTS

| | | | | | |
|---|---|---|---|---|---|
| FR | | 2862991 A1 | * | 6/2005 | ......... B60B 17/0013 |
| FR | | 2935715 A1 | * | 3/2010 | ............. E01B 31/18 |
| WO | WO-2015197043 A1 | | * | 12/2015 | ............. B61L 21/10 |

*Primary Examiner* — Zachary L Kuhfuss

(57) ABSTRACT

Described is a hybrid transportation system with hybrid vehicles (H-vehicles) that can travel on pavement (or off-road), then transition to railroad track travel, and then later transition back onto pavement without stopping or requiring an operator to exit the vehicle. At static rail junctions (with no moving switch parts) the H-vehicle selects its outgoing track. Turns at passive junctions are made by applying lateral force which may be applied using multiple methods including side roller diverters, dual flange rail wheels, and steering. Separate road wheels and rail wheels may be employed on an H-vehicle, or a combination wheel can be used with concentric road and rail wheel components. Combination wheels may be locked together or unlocked with relative rotational angular velocities. Transition between road and rail travel is facilitated using transition spans which connect roads to rails. Improved rail-only vehicles (R-) vehicles and junctions are also described.

20 Claims, 32 Drawing Sheets

(56)                References Cited

U.S. PATENT DOCUMENTS

| 2,842,393 | A | * | 7/1958 | Lorig | B60B 17/0034 |
| | | | | | 104/118 |
| 2,955,546 | A | * | 10/1960 | Liebherr | B66C 9/04 |
| | | | | | 212/346 |
| 3,093,091 | A | * | 6/1963 | Tax | B66C 9/04 |
| | | | | | 105/169 |
| 3,892,187 | A | * | 7/1975 | White, Jr. | B61C 15/00 |
| | | | | | 105/215.2 |
| 4,224,875 | A | * | 9/1980 | Knippel | E01B 7/00 |
| | | | | | 246/469 |
| 4,355,584 | A | * | 10/1982 | White, Jr. | B60F 1/043 |
| | | | | | 105/72.2 |
| 6,324,994 | B1 | * | 12/2001 | Glenn | B62M 6/75 |
| | | | | | 105/72.2 |
| 6,988,451 | B2 | * | 1/2006 | Marcotte | B60F 1/043 |
| | | | | | 105/215.1 |
| 7,201,106 | B2 | * | 4/2007 | Whiston | B61D 15/00 |
| | | | | | 105/72.2 |
| 8,950,337 | B1 | * | 2/2015 | Davis | E01B 25/00 |
| | | | | | 104/130.07 |
| 9,682,600 | B2 | * | 6/2017 | Claypool | B60F 1/04 |
| 10,427,697 | B2 | * | 10/2019 | Bramlett | B61F 5/38 |
| 11,230,813 | B1 | * | 1/2022 | Williams | B60F 1/04 |
| 11,364,940 | B1 | * | 6/2022 | Williams | B61B 13/00 |
| 12,311,713 | B2 | * | 5/2025 | Williams | E01B 25/28 |
| 2010/0211238 | A1 | * | 8/2010 | David, Jr. | B61B 15/00 |
| | | | | | 701/19 |
| 2010/0294848 | A1 | * | 11/2010 | Bullis | B60B 17/0072 |
| | | | | | 188/41 |
| 2014/0261060 | A1 | * | 9/2014 | Dumalski | B60F 1/04 |
| | | | | | 105/72.2 |
| 2022/0072921 | A1 | * | 3/2022 | Ostrowski | B60F 1/02 |
| 2025/0135815 | A1 | * | 5/2025 | Williams | B60F 1/02 |

* cited by examiner

─100C

SECTION A-A'

RATIO =.6667
R2 = 24
R1 = 16

SECTIONS

SECTION A–A'

800B

ROAD TO RAIL HYBRID VEHICLES USING PASSIVE JUNCTION AND TRANSITION SPANS

FIELD

This invention relates to rail systems in general and to hi-rail (highway-rail) vehicles and track switching systems in particular.

BACKGROUND

Rail vehicles have an advantage over road vehicles of low rolling resistance resulting in dramatically better fuel economy, much lower $CO_2$ emissions and a rail that can provide renewable electric power. Railroads are cheaper to build than highways, safer, use less real estate, and a track can transport a same traffic load as several lanes of a highway. Unfortunately, rails don't go everywhere that people and materials need to go.

Hi-Rail vehicles can travel over both highways and railroad tracks. The railroad wheels are typically located in retractable pairs in the front and back of a vehicle, which may be a maintenance truck. These systems have a bad reputation for safety caused in part by a need for the vehicle operator to exit the vehicle to lower the rail wheels. Frequently, rail mounting occurs in the road at intersections between rail and roads. This is inherently a dangerous location. Lowering rail wheels onto the rail requires precise truck to track alignment so rail wheel flanges align with the insides of the rails. Typically rail wheels on one end of the truck are lowered, the vehicle is re-positioned if necessary, and then the wheels on the other end of the truck are lowered. Cameras may be used to assist a driver with alignment. Typically the hi-rail vehicle's rail wheels are not used for traction, but only to maintain road wheel alignment over said tracks. Road wheels that don't supply traction are often lifted off of the rail to reduce rolling resistance. Two weaknesses of hi-rail vehicles are poor breaking and weak traction force.

In patent U.S. Pat. No. 11,364,940, a passive system of rails is described with static junctions having no moving components. On-rail vehicles decide which direction to take at a junction by applying lateral force to the vehicle. There are gaps in the junction rails called "flange paths" that allows the vehicle to select its own turn using lateral (or side) force. There are numerous methods of applying side force to the vehicle, including side rollers acting as diverters, magnets, and wheel steering. One feature of this invention is a wider-than-normal tread (cylindrical section) on the rail wheels which provides support while passing over gaps in the rails created by flange paths. Other rail systems are described in U.S. Provisional Patent Application Ser. No. 62/918,544 filed Feb. 4, 2019, U.S. Non-Provisional patent application Ser. No. 16/780,015 filed Feb. 3, 2020, U.S. Non-Provisional patent application Ser. No. 17/072,664 filed Oct. 16, 2020, U.S. Provisional Patent Application 63/133,509 filed Jan. 4, 2021, U.S. Non-Provisional patent application Ser. No. 17/728,591 filed Apr. 25, 2022, U.S. Provisional patent application Ser. No. 63/531,983 filed Aug. 10, 2023, and U.S. Non-Provisional patent application Ser. No. 18/383,894 filed Oct. 25, 2023. The subject matter and disclosures of all of these prior applications are incorporated by reference herein in their entireties.

The pursuit of driver-assisted and self-driving cars has resulted in many automotive advancements that can be employed to enable hybrid vehicles. Transitioning between rail and road travel can be made very fast, easy, safe, and automatic.

A personal rapid transit system (PRT) is a hybrid between cars and train service and is designed to transport one to a small number of persons. PRTs usually have a number of characteristics including direct service with few stops. PRT tracks have turnouts so passenger pickup or drop-off does not block thru traffic. PRT systems use computers and communications to coordinate vehicle movement. Technology described in this patent application extends PRT capability with vehicles that can optionally leave the tracks and travel on and off roads using transition spans. The PRT in Morgantown West Virginia, USA is an example of a rail-only PRT system.

An H-vehicle may be used for mass transit, in personal rapid transit (PRT) system, autonomous delivery of material, people, or packages, for a light rail system, or on high-speed rails. It may be used on public infrastructure, private property, or in manufacturing facilities. It may also share tracks with other rail systems.

There is also a nascent recreational industry called rail-biking that uses four-wheeled pedal carts designed to travel on abandoned rails, usually situated on a piece of track with no or fixed junctions. The carts are often made of light-weight material like aluminum and use polyurethane wheels and carry two or four passengers. Sometimes they have a motor assist mechanism. Frequently they follow scenic rail routes with rivers or mountains. They suffer from challenges like an inability to pass, one-way only operation, and difficult turn-around procedures. There are also vehicles that employ a mounted bicycle on one rail and an outrigger wheel on the opposite rail. They also suffer the same limitations as the four-wheeled carts.

Components of a conventional rail wheel consist of a cylindrical portion called a tread and a flange which is used for aligning and maintaining a rail vehicle over a set of tracks. Typically the tread has a small taper used to maintain track alignment. The flange may be described as having a width, a depth, an angled surface for rail contact, and a flange tip. In some embodiments in this invention the width of the road wheel tip is made much wider to mount a road tire, becoming a road wheel tip. In U.S. Pat. No. 11,364,940 a width of the tread can be made wider (than conventional treads) to avoid wheel drop while going over a gap in a rails, which occurs in junctions.

It is an object of this invention to reduce fuel use for transportation and improve safety. It is also an object of this invention to facilitate automatic hybrid vehicle transition between road travel and rail travel safely without a need for a vehicle to stop or for an operator. It is also an object of this invention to allow an H-vehicle to use a same steering mechanism both on rail and on pavement. Another object of this invention to enable a Traffic Control System (TCS) to control H-vehicles while they operate on rails, while it transitions to and from rail travel, and optionally control vehicle operation while on a road (self driving car mode). Another object of this invention to allow the building of rail systems with a tight turning radius on tracks that are navigated by rail vehicles with steering. Another object of this invention is to build a hybrid road-rail systems that utilizes conventional rail wheels having a narrow tread surface.

It is also an object of this invention to get semi-trucks with trailers off of highways and onto railroad tracks using road-rail transition spans, avoiding highway damage and reducing fuel consumption. Tracks may run adjacent to the highways. A standard rail gauge in the USA and in many other countries is 1435 mm.

A problem is that global warming from atmospheric $CO_2$ is threatening the existence of millions of humans on planet Earth. A partial solution is energy conservation for transportation and using energy from renewable sources. These two inventions target the 27.5% of $CO_2$ output from transportation by moving people and materiel from roads to rails. Rail transportation provides dramatically less rolling resistance on steel rails relative to rubber tires.

SUMMARY OF THE INVENTION

A road-rail transportation system using hybrid (H-) vehicles, rails with passive junctions, roads, and transition spans connecting the roads to the rails where a vehicle travels on both roads and rails to reach its destination. Vehicles can use eight wheels with four of the wheels being retractable or 4 combination wheels. Combination wheels can be locked or unlocked.

A rail transportation system with standard rails and passive junctions, rail (R-) vehicles applying lateral force at junctions using steering, the passive junctions having a 6 rail configuration with wide tread wheels on the vehicles or a 4 rail configuration with wheel flange path support surfaces supporting wheels with road wheel tips. Lateral force can be applied at junctions to direct a vehicle turn using rollers, rail wheels with single flanges, rail wheels with dual flanges, road wheel steering, or rail wheel steering.

Toy/scale models and full scale applications are anticipated.

DESCRIPTION FIG. 1A

FIG. 1 is a top view 100A of a road-rail transportation system. Traditionally road and rail transportation systems operate separately and independently. A vehicle that works well in one mode generally does not work well (or at all) on another. Exceptions include vehicles called a Hi-rail (or highway-rail) vehicles that can adapt to travel in both modes using retractable rail wheels. Hi-rail vehicles are usually modified trucks that are used for rail services. While mounted on rails, the Hi-rail vehicles do not steer: they just follow the tracks. At rail junctions Hi-rail vehicles follow conventional active (non-static) switch settings.

Figure 1A:
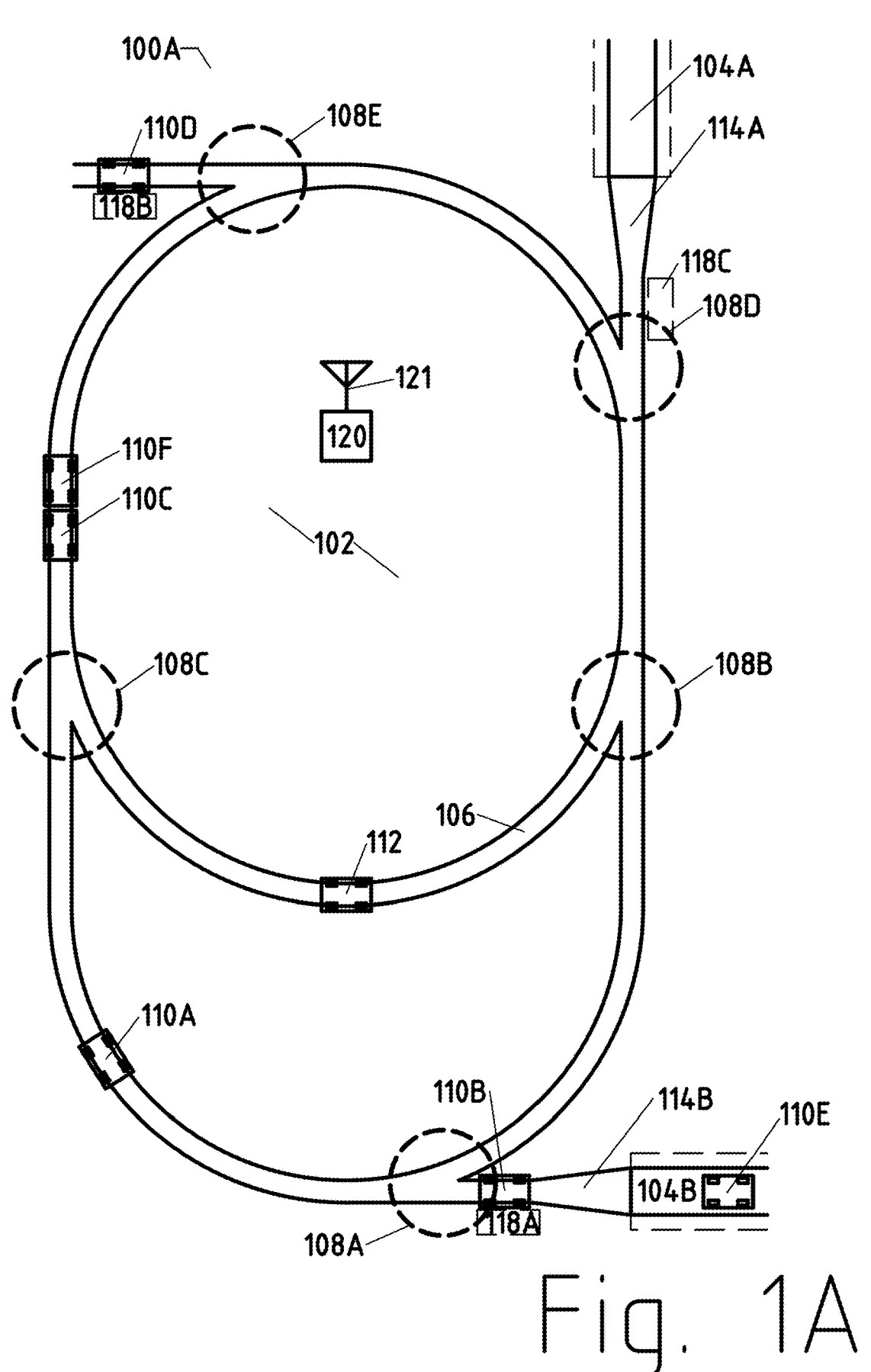
FIG. 1A is a top view of a road-rail transportation system.

The transportation system 102 illustrated in FIG. 1A consists of conventional rails e.g. 106, conventional roads 104A and 104B, passive junctions (or turnouts) 108A-E, transition spans 114A-B between rails and roads, and H-vehicles 110A-110F that can travel over both roads and rails. Passenger loading locations 118A-118C allow people to board vehicles. Rail-only R-vehicle 112 can travel only over rails, but at the passive rail junctions or turnouts the R-vehicle also can decide which way to turn while component parts in a junction below remain static. Illustrated in the transportation system are an H-vehicle on the road 110E, H-vehicles on the rails 110A, 110C and 110F, an H-vehicle 110E entering a junction 108A and an R-vehicle 112 on rails. H-vehicles 110C and 110F are drafting each other to reduce wind resistance. Ideally all traffic is choreographed by a Traffic Control System (TCS) 120 with an antenna 121 while vehicles are on the rails or on transition spans. Wireless communications with vehicles is anticipated. Vehicles may be assigned exclusive moving space-time slots which prevents collisions if every vehicle is in its assigned position.

On rails R-vehicles and H-vehicles apply lateral force to determine direction of travel at junctions. There are multiple methods of applying lateral force as disclosed in U.S. Pat. No. 11,364,940. They include everything from telling a horse pulling an R- or H-vehicle "gee" or "haw" to go left or right, to side roller diverters, to electromagnets, to steering. There are also multiple possible steering methods, which include skid steering, articulated steering, four-wheel steering, crab steering, and Ackermann steering. Steering can use two or four wheels rotating relative to a chassis. In this disclosure, articulated steering is illustrated, but other steering methods work as well. Also, lateral force will be applied using steering, but other methods of applying lateral force also work.

H-vehicles can use their steering both on the rails and on the roads to determine direction of travel. On the road, the steering must be continuous to stay in a lane, but on rails steering may only be required at rail junctions. A non-obvious reason to steer an R- or H-vehicle on a rail is to follow a tight track turn with a small radius without a rail wheel flange contacting an edge of rail. A vehicle with fixed wheels (no steering) will not be able to make as tight of a turn as one employing steering. A tight turn radius means a track or junction location can occupy less real estate.

H-vehicles can mount or dismount the rail using just a transition span such as 114A or turnout with a transition span, such as 108A and 114B. The transition span can connect to the termination of a road. Alternately H-vehicles can use turnouts connected to transitions spans to mount and dismount rails without interrupting rail traffic. Another use for transition spans or turnouts is for pickup or delivery points for passengers, as illustrated at passive junctions 118A-C. This allows passengers to get into an H-vehicle or R-vehicle which can then back onto a rail or go to road travel, depending on passenger destinations. Rail point 118B is a turnout passenger pickup location without a transition span. After picking up a passenger, an H- or R-vehicle would back up onto the rail and continue in rail mode. Alternately the H- or R-vehicles can drive forward onto the trail with an additional junction (not illustrated). H-vehicles can enter a transition span traveling forward or backwards so passengers face forward while traveling.

Figure 7A:
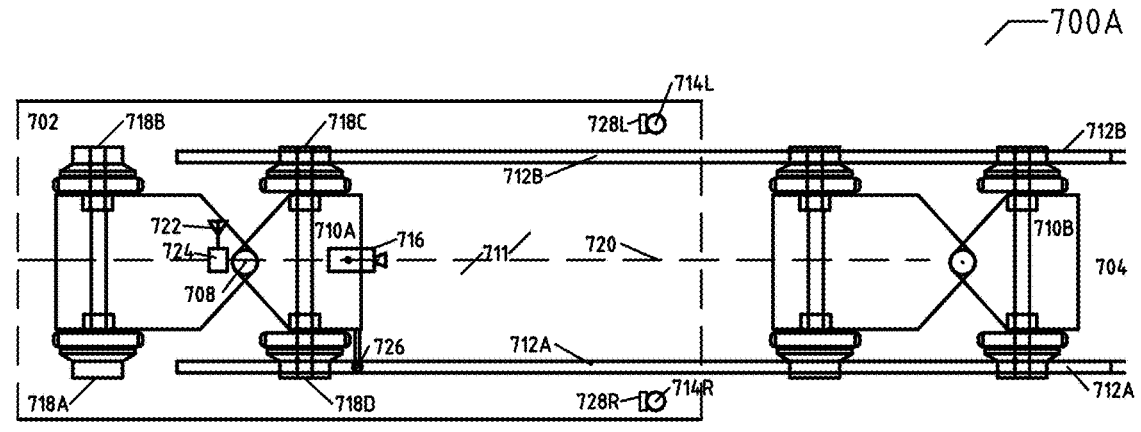
FIG. 7A are top and side view of a first electronic assist transition span.
Figure 7A:
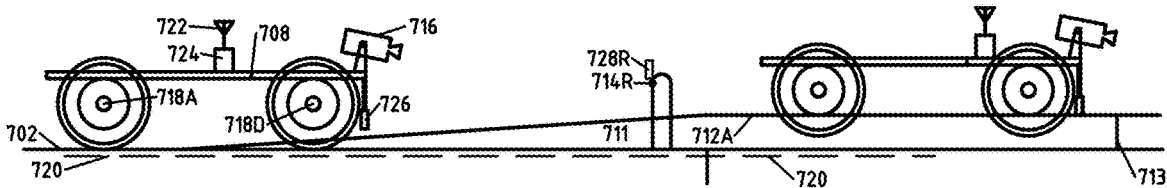
Figure 7B:
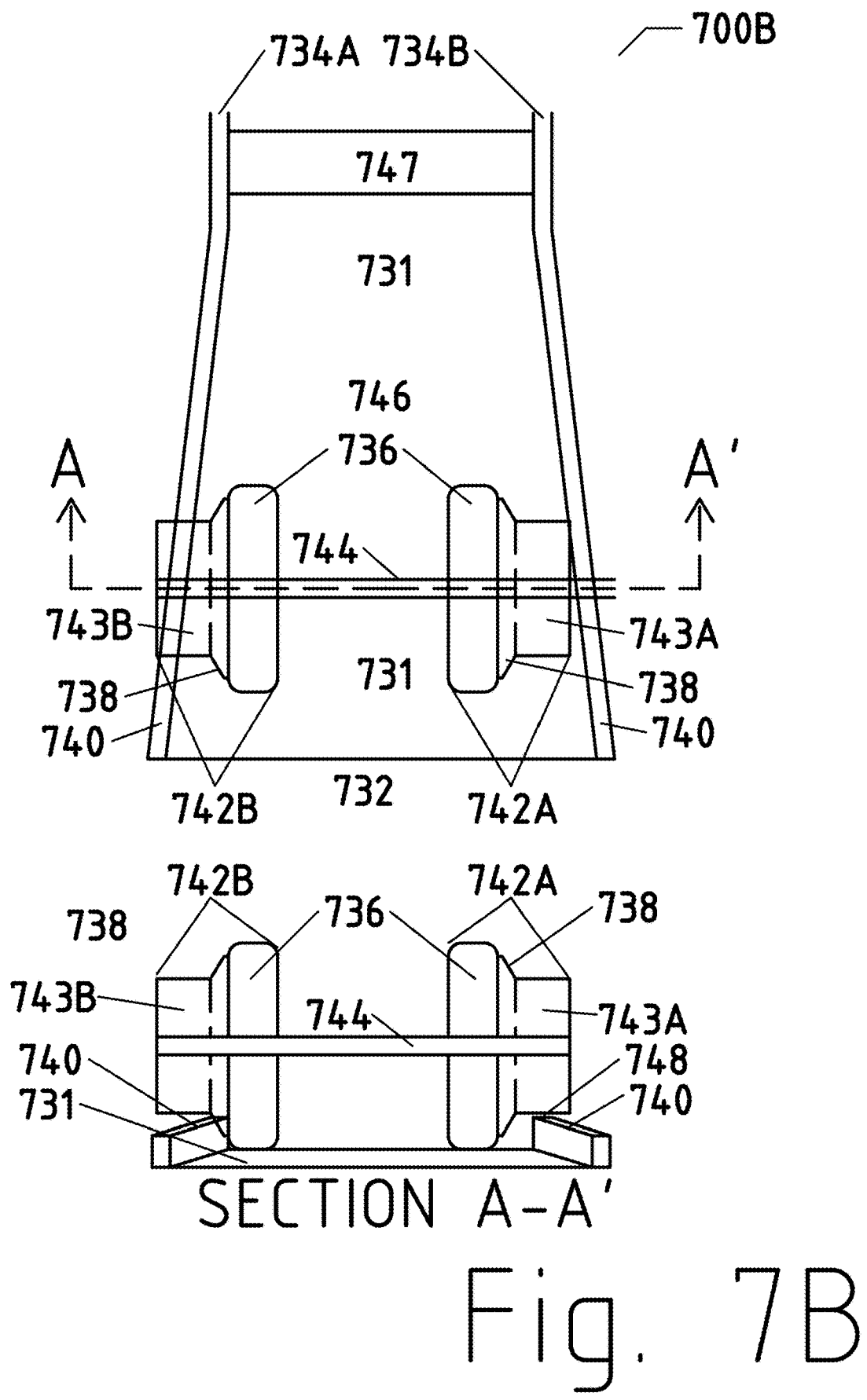
FIG. 7B are top and sectional view of a second mechanical transition span.

The transportation system can also share tracks with a conventional track rail system with active junctions using a 3-way switch, as illustrated in FIGS. 7A and 7B of U.S. Pat. No. 11,364,940. The 3-way switch has positions of turn left, turn right, or vehicle decides.

Subsequent figures will explain the operation of elements of the road-rail transportation system.

Passive junctions can contain four or six rail elements.

DESCRIPTION FIG. 1B

Figure 1B:
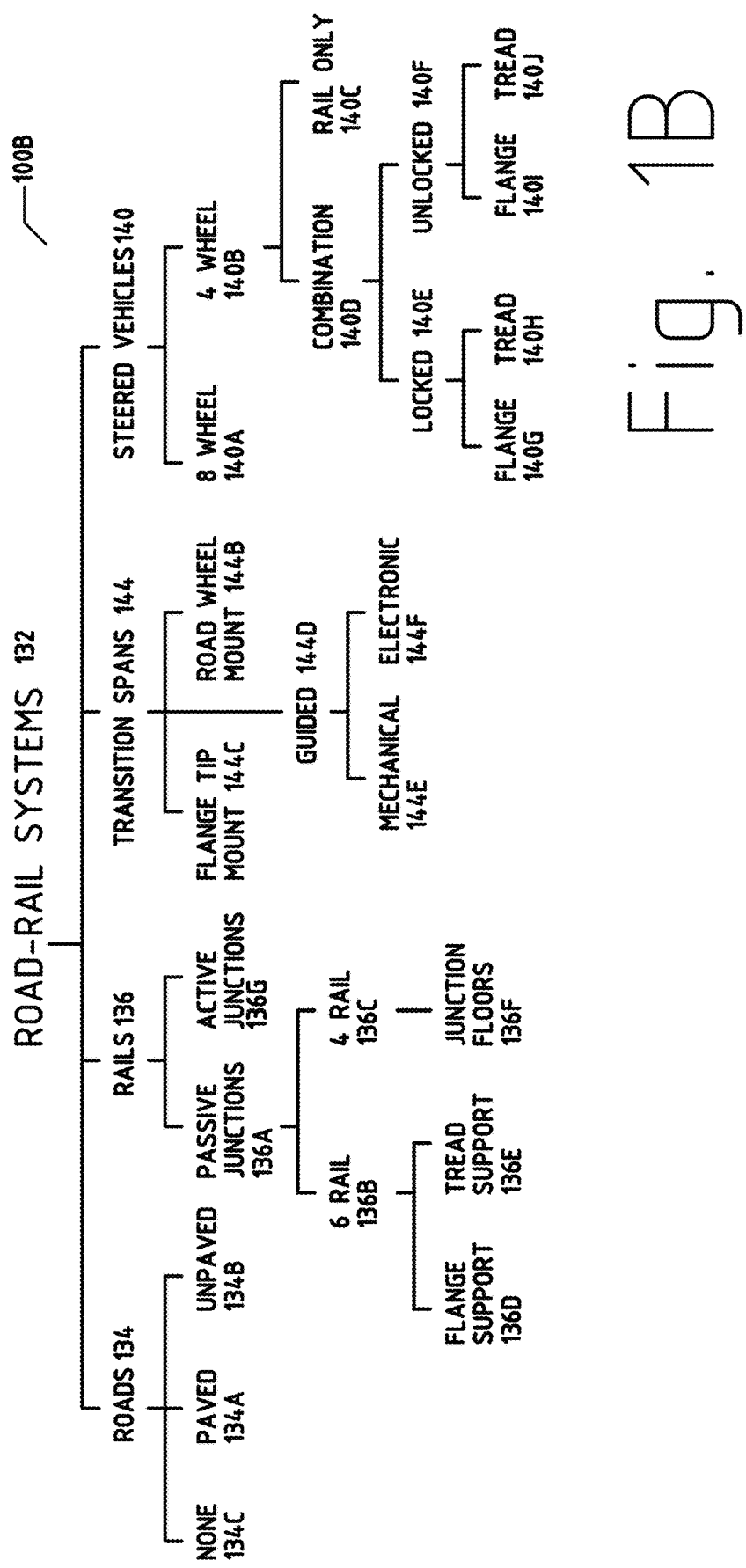
FIG. 1B is a tree diagram of a road-rail system options.

FIG. 1B is a tree diagram 100B of road-rail systems 132. There are options. A road-rail system consists of roads 134, rails 136, transition spans 144 that connect roads and rails, and steered vehicles 140.

Roads may be paved 134A or unpaved 134B, such as gravel, dirt, or grass. There is also an option for no roads 134C, or roads in the future.

Rail 136 are categorized by the design of their active junctions 136G or passive junctions 136A, which are also called passive turnouts. Passive junctions 136A can be comprised of six rails 136B as described in U.S. Pat. No. 11,364,940 or four rails 136C. A vehicle passing over a six rail junction can be supported by a road wheel tip (flange) support 136D or rail wheel wide tread support 136E in the junction. A wheel passing over a four rail junction 136C has its road wheel tip support supported by a junction floor 136F.

Transition spans 144 can be categorized by first contacting road wheels 144B or first contacting road wheel tips (flange) 144C. They can also be categorized by guidance method 144D. Vehicles may be mechanically guided 144E or electronically guided 144F using steering. A mechanical support for an H-vehicle on an electronic guided transition span can be as simple as a set of rails rising out of (or sinking into) a pavement.

Vehicles are ideally steered 140 by one of several possible methods. One application is eight wheel vehicles with four road wheels plus four rail wheels 140A, and vehicles with four wheels 140B. The four wheel vehicles can use rail-only wheels 140C or combination wheels 140D. The road wheel tip part (or section) of a combination wheel makes contact with roads and the tread part (or section) of a combination wheel makes contact with the rails. The sections can be locked together 140E or unlocked 140F. Both locked and unlocked wheels have both flange parts 140G and 140I and tread parts 140H and 140J for support. Both flange parts and tread parts can be conventional (narrow) or wide. Steered road and rail wheels are steered for different reasons. Road wheels are steered to keep a vehicle in its road lane and rail wheels are steered to provide lateral force at junctions, to guide a vehicle on a transition span, and to allow travel on tracks with a tight turn radii.

Figures will explain capabilities and options/limitations. For example, a Hi-Rail vehicle could be located on this diagram except its rail wheels cannot be steered, and transition spans are not currently used.

DESCRIPTION FIG. 1C

Figure 1C:
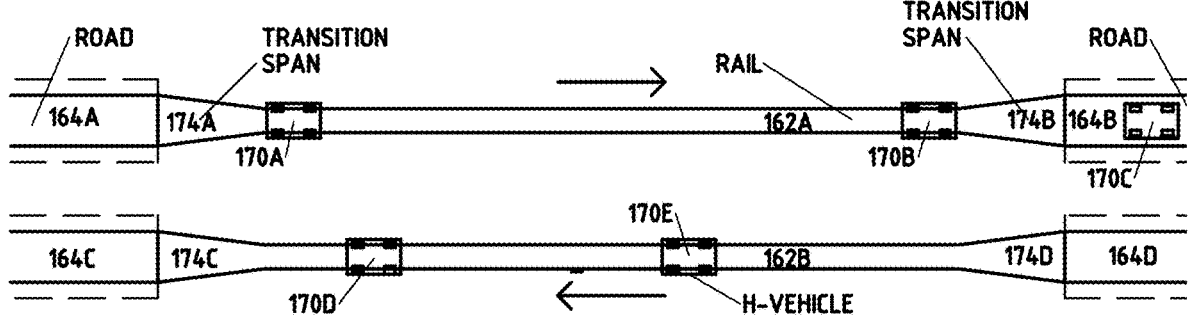
FIG. 1C is a top view of a pair of express road-rails.

FIG. 1C is a top view 100C of a pair of express road-rails. It can be used to offload road traffic. This system can be used to bypass highways in a city, increasing safety, reducing energy used, decreasing air pollution and reducing road damage. Bidirectional rails are 162A-B and bidirectional roads are 164A-D. Transition spans 174A-D connect rails and roads. H-vehicles 170A-E travel between roads and rails using transition spans.

This system can be particularly advantageous for use by semi-tractor trailers which damage roads. This system could also be implemented with one rail with turnouts (or sidings) to allow vehicles traveling in different directions or traveling at different speeds to pass on the single rail. For example the Patagonia region of Argentina has (abandoned) single rails and could be a good remote location for such an embodiment, bringing service to remote ranches and towns.

A network of these express road-rails can be built to make a transportation system with route switching done on roads, but a more efficient transportation system can be built with the addition of passive rail junctions.

DESCRIPTION FIG. 1D

Figure 1D:
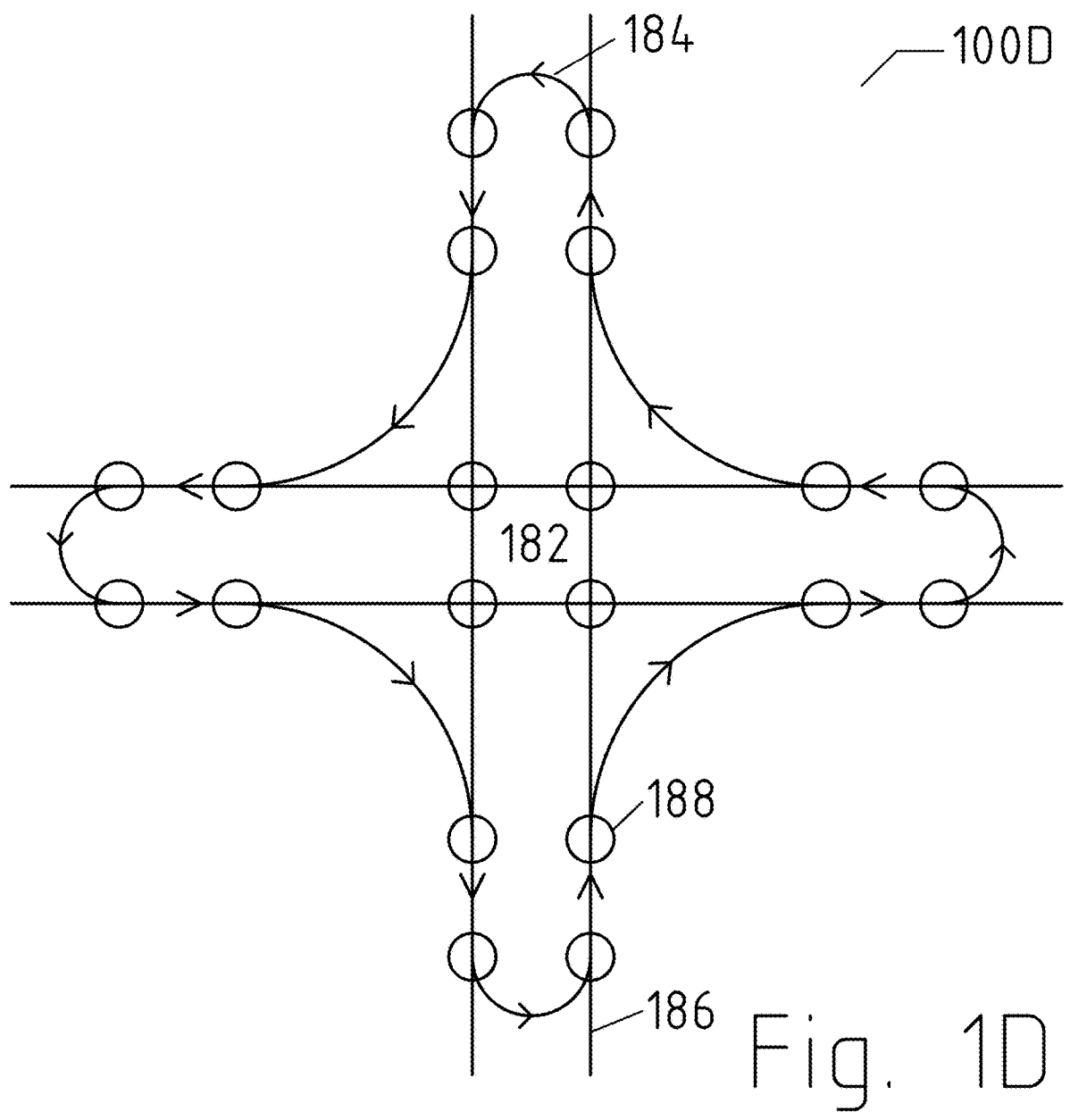
FIG. 1D is a top view of a passive rail bidirectional interchange.

FIG. 1D is a top view 100D of a passive rails bidirectional interchange 182. Vehicles coming into this interchange from any direction can exit to any direction. A pair of tracks 186 is identified as a single line in the figure. Travel direction is identified with arrows. Passive junctions e.g. 188 are identified with circles. Passive junctions are applications for vehicle steering as a source of lateral force. In the middle are four crossings, which are also applications for flange support surfaces. A tight turn radius enables a turn-around at point e.g. 184. This interchange can be built at grade saving construction cost. A TCS or traffic control system is anticipated.

DESCRIPTION FIG. 2A

Figure 2A:
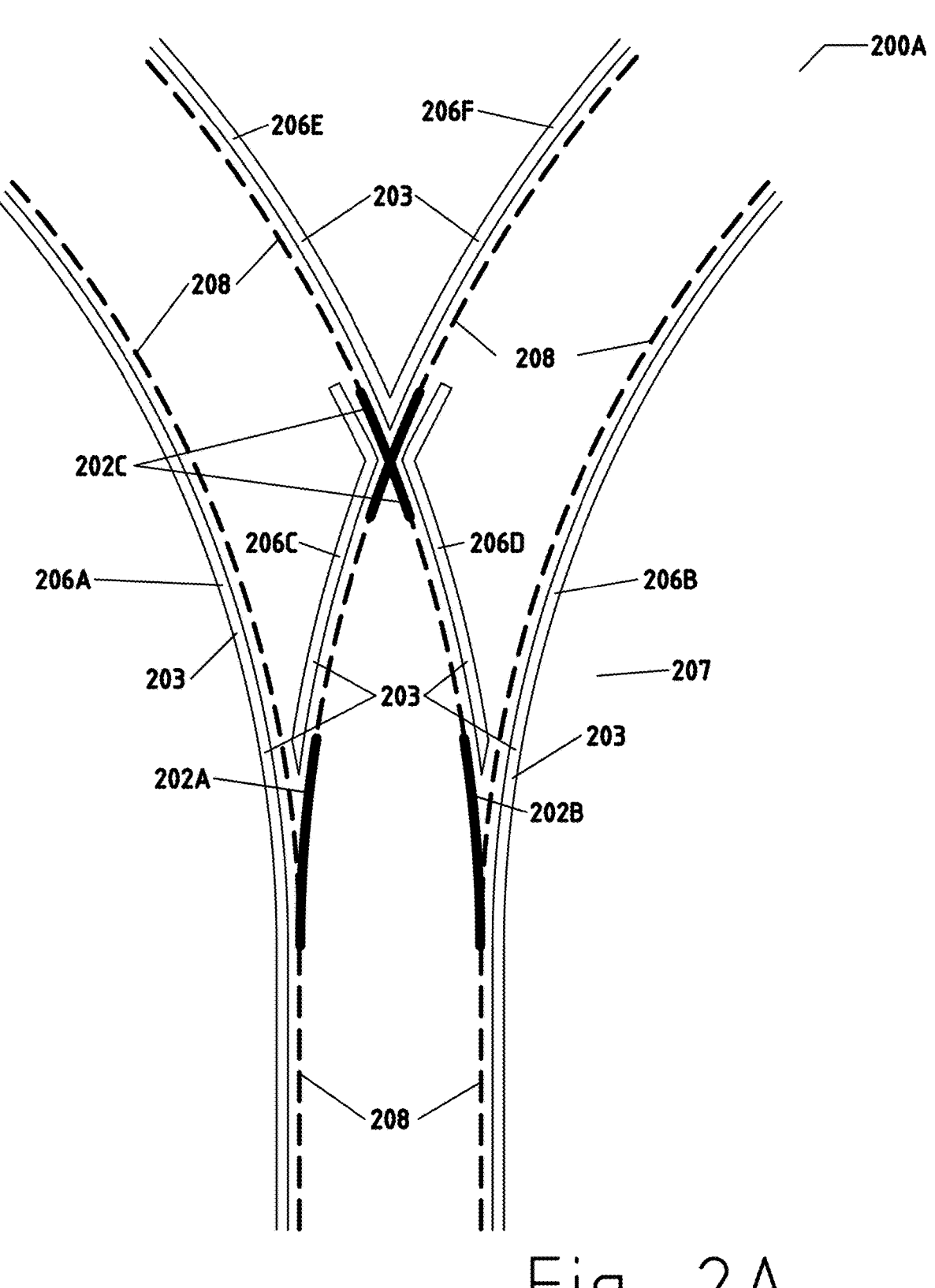
FIG. 2A is a top view of a passive six rail junction for use by either H-vehicles or R-vehicles.

FIG. 2A is a top view 200A of a passive six rail junction 207 for use by either H-vehicles or R-vehicles. Elements of this figure were extracted from patent U.S. Pat. No. 11,364, 940. In this patent R-vehicle wheels are described that have wide treads and conventional flanges. As a rail wheel passes over a rail gap the wheel does not drop because it receives continuous support from a wide tread on the rail wheel.

Vehicles using this junction to turn may use four rail wheels if they are rail-only (R-) vehicles. If they are H-vehicles they may use four road wheels plus four different rail wheels. Alternately, if they are H-vehicles they may use four combination wheels. Combination wheels have a rail portion with a tread for rail support and a road portion with a road wheel tip for road support. The road wheel tip can also be used for vehicle support in junctions or transition span.

Illustrated are the tops of rails 203 and flange paths 208 which are shown as dashed lines. The flange paths 208 allows rail wheel or combination wheel flanges to cross (or pass through) other rails at passive junctions. Identified are an alpha rail 206A, a beta rail 206B, a gamma rail 206C, a delta rail 206D, an epsilon rail 206E and a zeta rail 206F. All rails remain static. Vehicles choose which path to take by applying lateral force when approaching the junction. Steering, diverters and other methods can be used to apply lateral force. The tops of the rails 203 are essentially at the same height.

Also illustrated as heavy lines are the three optional surfaces situated in the bottoms of the flange paths around the gaps. These are flange support surfaces 202A-202C which are elevated bottoms (or floors) in the flange path in a junction. The elevated floor can be used to support a road wheel tip of a conventional (narrow tread) rail wheel while passing over a gap in the rails, preventing rail wheel drop. A junction can be configured as a split, illustrated in FIG. 2A, a left turnout, a right turnout, or other configurations. R-vehicles, as described in U.S. Pat. No. 11,364,940 do not require flange support surfaces because they use rail wheels with wide treads.

DESCRIPTION FIG. 2B

Figure 2B:
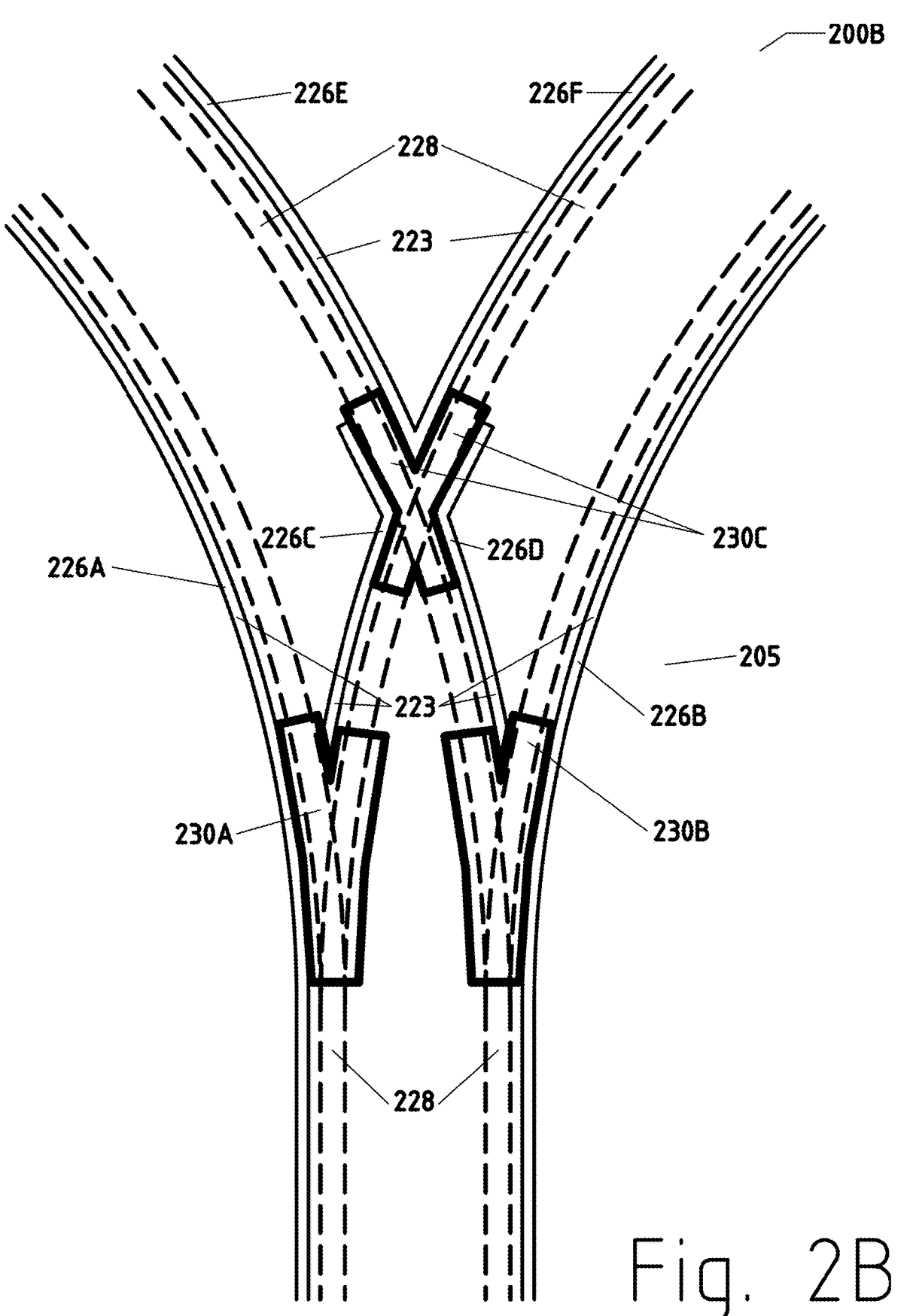
FIG. 2B is a top view of a passive six rail junction that is FIG. 2A modified.

FIG. 2B is a top view 200B of a passive six rail junction 205 that is FIG. 2A modified. Rail junction 207 of FIG. 2A has been modified to allow the passage of combination wheels with wide flanges. The wide flanges have load bearing tires on road wheel tips that may be made of an elastic material, such as rubber. Rails identified are an alpha rail 226A, a beta rail 226B, a gamma rail 226C, a delta rail 226D, a gamma rail 226E and a zeta rail 226F. Rail tops 223 are all essentially at a same height. Wide flange paths 228, illustrated as areas between dashed lines, contains wide flange support surfaces 230A-C located a uniform distance below the rail tops and above rail ties (or sleepers).

Ultimately as the tire portion of the combination wheel gets wider and wider the wide flange paths 228 get increasingly wide until the gamma and delta rails shrink and disappear. At some point using a wide flange on a combination wheel to prevent rail gap drop becomes impractical because it is too long, but the flange support surfaces 230A-C prevent combination wheels from dropping into rail gaps by supporting road wheel tips. Upper and lower flange support surfaces 230A-C illustrated as areas between thick solid lines support the wide road wheel tips on the combination wheels when rail support is lost for a combination wheel tread. The upper and lower flange support surfaces may optionally be connected.

DESCRIPTION FIG. 2C

Figure 2C:
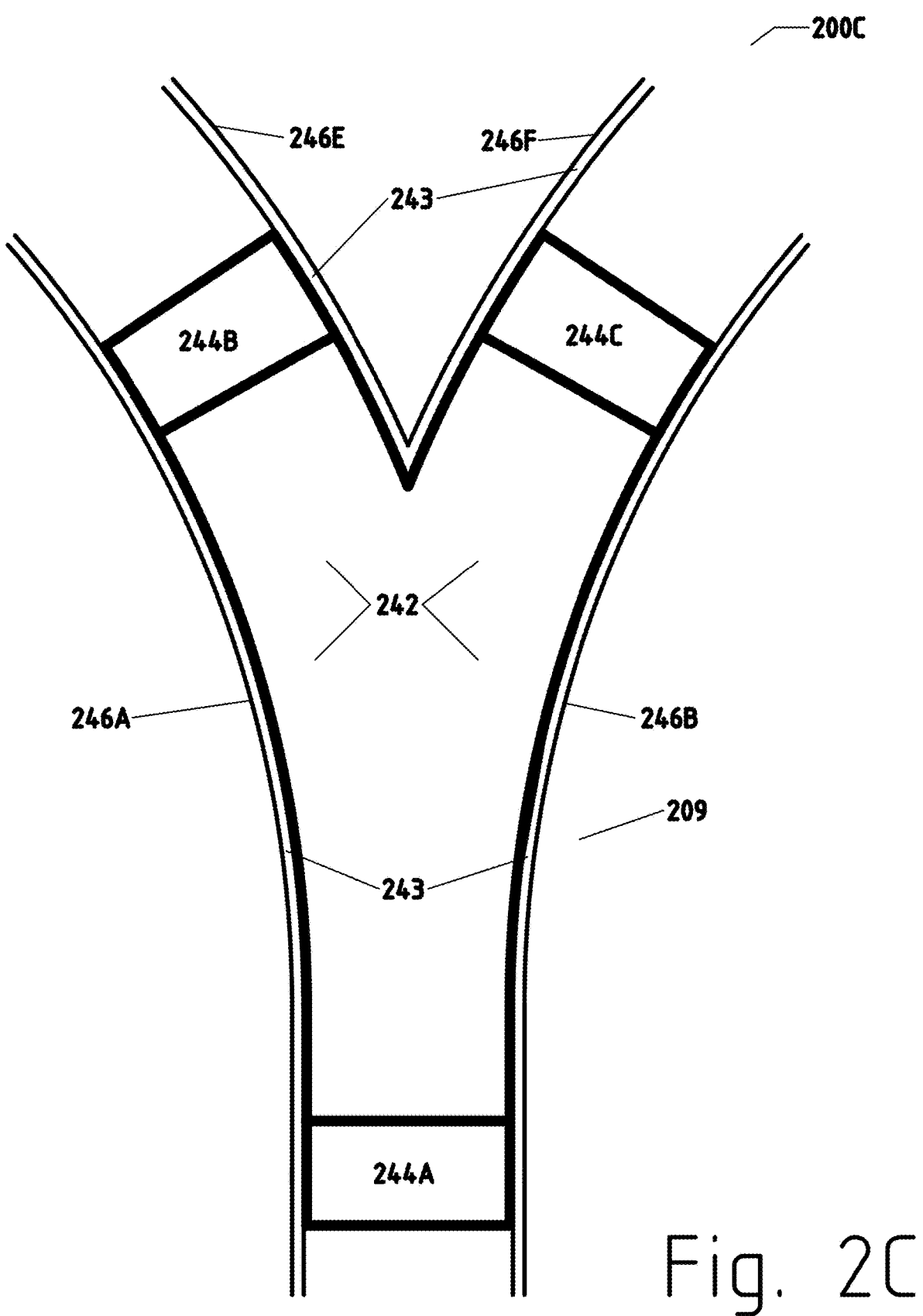
FIG. 2C is a top view of a passive rail junction used by H-vehicles with four combination wheels.

FIG. 2C is a top view 200C of a passive rail junction 209 used by H-vehicles with four combination wheels. Rails identified are an alpha rail 246A, a beta rail 246B, an epsilon rail 246E and a zeta rail 246F. Rail tops 243 are all essentially at a same height. Gamma and delta rails are not used. This illustrates what happens when a wide flange path expands and overtakes the gamma and delta rails. This drawing brings up a question of how a vehicle passing through this junction to the right or left receives support for wheels not contacting a rail. Support is provided by the road wheel tips on the combination wheels contacting a junction floor 242. The junction floor is located a uniform distance below the rail tops.

The combination wheel road wheel tips may be narrow and made of steel, so are only suitable for running on hard surfaces. Alternately, the road wheel tips may be wide and made of rubber and so are also suitable for also running on paved roads without damage to the road's pavement. The junction floor 242 can be made of steel for durability or pavement material such as reinforced concrete to provide better traction.

Illustrated also is an up ramp 244A leading up to the junction floor. Its job is to engage a combination wheel's road wheel tip to lift tread parts of the H-vehicle's wheels slightly above a rail while going into a junction. Junction down ramps 244B and 244C place the H-vehicle's wheel tread back onto the tracks and leave the road wheels suspended in the air.

DESCRIPTION FIG. 3A

Figure 3A:
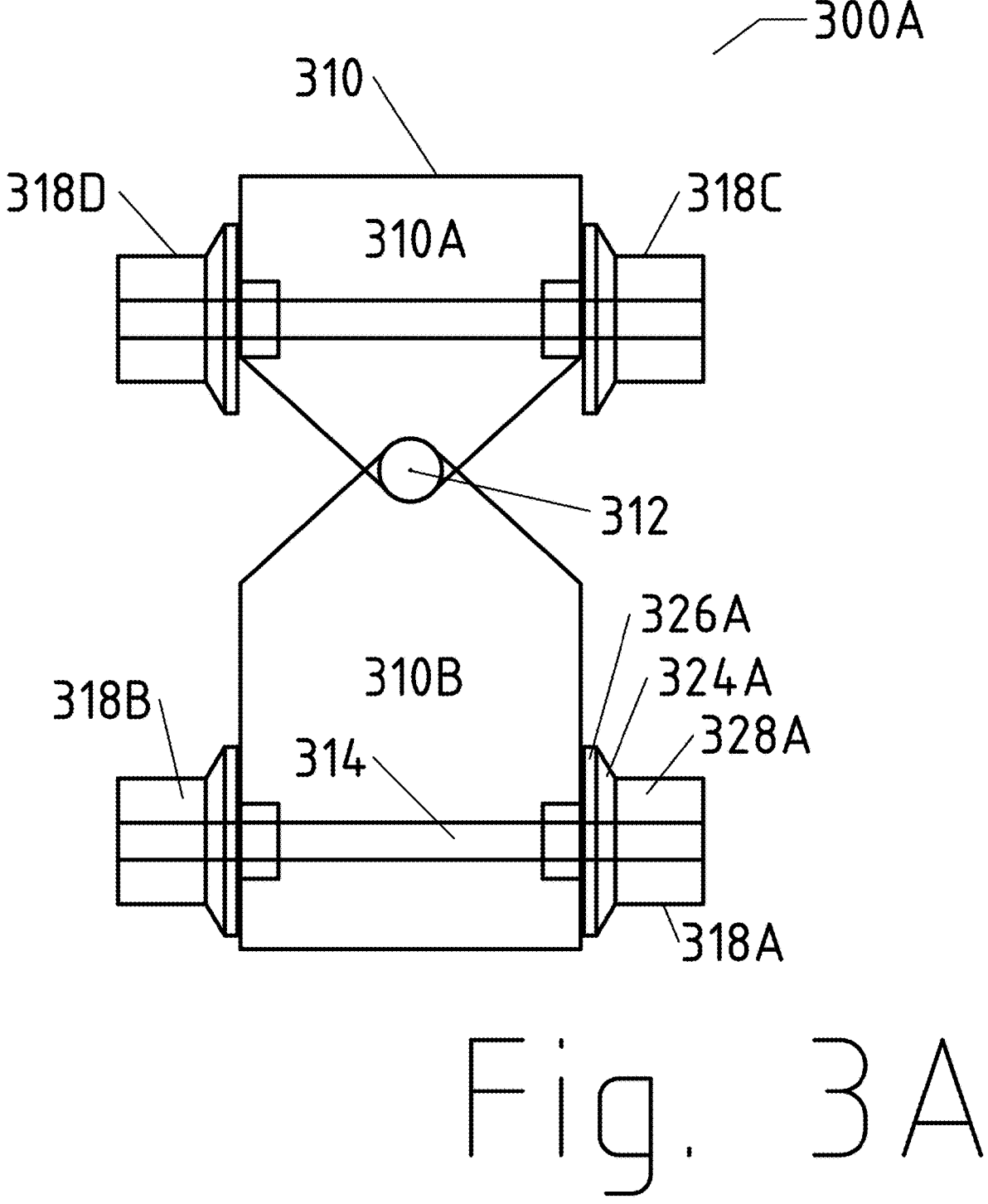
FIG. 3A is a top view of R- or H-vehicle with four wheels and steering.

FIG. 3A is a top view 300A of an R- or H-vehicle 310 with 4 wheels and steering. This vehicle can be used on rails exclusively or roads and rails, but its narrow flange tip 326A can damage roads and can provide poor traction on roads. It has a chassis front 310A and back 310B, a pivot point 312, 2 rail wheels in the front 318C-D and 2 rail wheels in the back 318A-B. This vehicle can be used over junctions as illustrated in FIG. 2A-C. The rail wheels 318A-D have flanges 324A with narrow flange tips 326A and wide treads 328A. The vehicle uses articulated steering by rotating the chassis sections around a pivot point 312. Steering may used for both road and rail travel. In normal straight rail travel or gradual turns the steering may be fixed, but steering may be employed to facilitate a very tight turn as mentioned previously. For example, if a narrow gauge track is located in mountains or hilly terrain, track turning radius may need to be small.

The narrow flange tips 326A can potentially cause damage to a surface that it comes into contact with, so contacted support surfaces must be durable, such as steel.

The rail wheels of the FIG. 3A chassis can be exchanged for road wheels for road-only travel, or for combination wheels that can be used for both road and rail travel, as will be discussed in FIG. 3C.

DESCRIPTION FIG. 3B

Figure 3B:
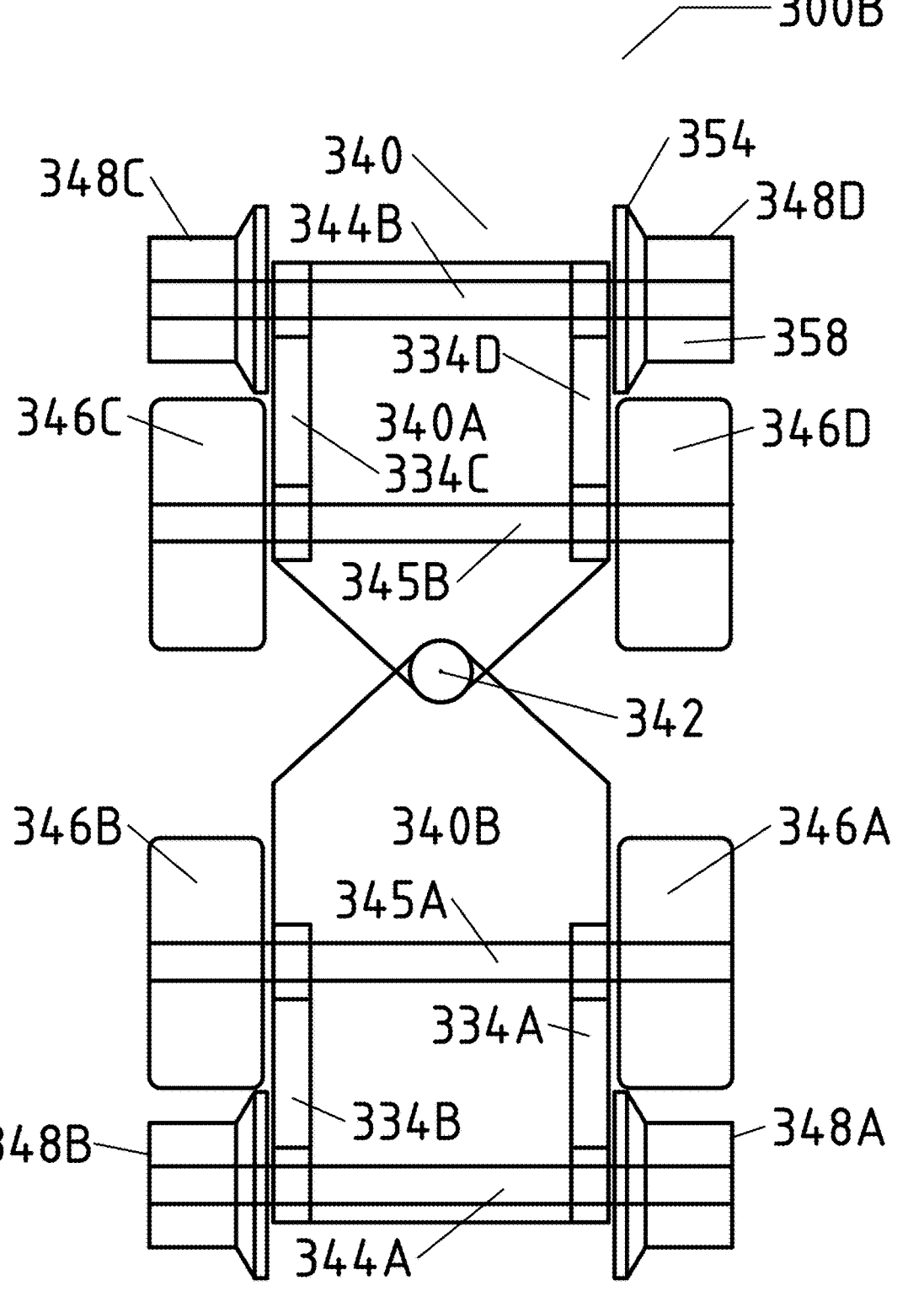
FIG. 3B is a top view of a steerable H-vehicle with four rail wheels and four road wheels.

FIG. 3B is a top view 300B of a steerable H-vehicle 340 with four rail wheels 348A-D and four road wheels 346A-D.

FIG. 3B contains a chassis front 340A and chassis back 340B, a pivot point 342. The four road wheels 346A-D are disposed in the middle of the vehicle and the four rail wheels 348A-D are located in the front and back of the H-vehicle. Rail wheels have flanges e.g. 354 and optionally wide treads e.g. 358. For road travel, the road wheels support the H-vehicle's weight. For rail travel, rail wheels support the H-vehicle's weight and keep the vehicle aligned over the tracks, although road wheels may also contact the rail tops for improved traction or braking.

A front rail axle 344B stays approximately parallel to a front road axle 345B in a turn, and a rear rail axle 344A remains approximately parallel to a rear road axle 345A in a turn. The vehicle uses articulated steering by rotating the chassis sections 340A and 340B around the pivot point 342. Articulated steering is used for road travel and also to make a left or right turn on rails. The same steering mechanism can also be used for rail travel to make turns by generating lateral force, or to navigate a tight radius curved track. In normal straight rail travel or gradual turns the steering may be fixed or locked, but steering may be employed to facilitate very tight turns. In a tight turn, flange to rail edge interference causes friction and wear and should be avoided.

Swing arms 334A-D are used to raise and lower rail wheels. Swing arms are connected between the chassis halves 340A and 340B and rail wheel axles 344A and 344B, and may be raised and lowered using manual means or actuators. Alternately swing arms can pivot around road wheel axles 345A and 345B instead of the chassis halves as illustrated.

DESCRIPTION FIG. 3C

Figure 3C:
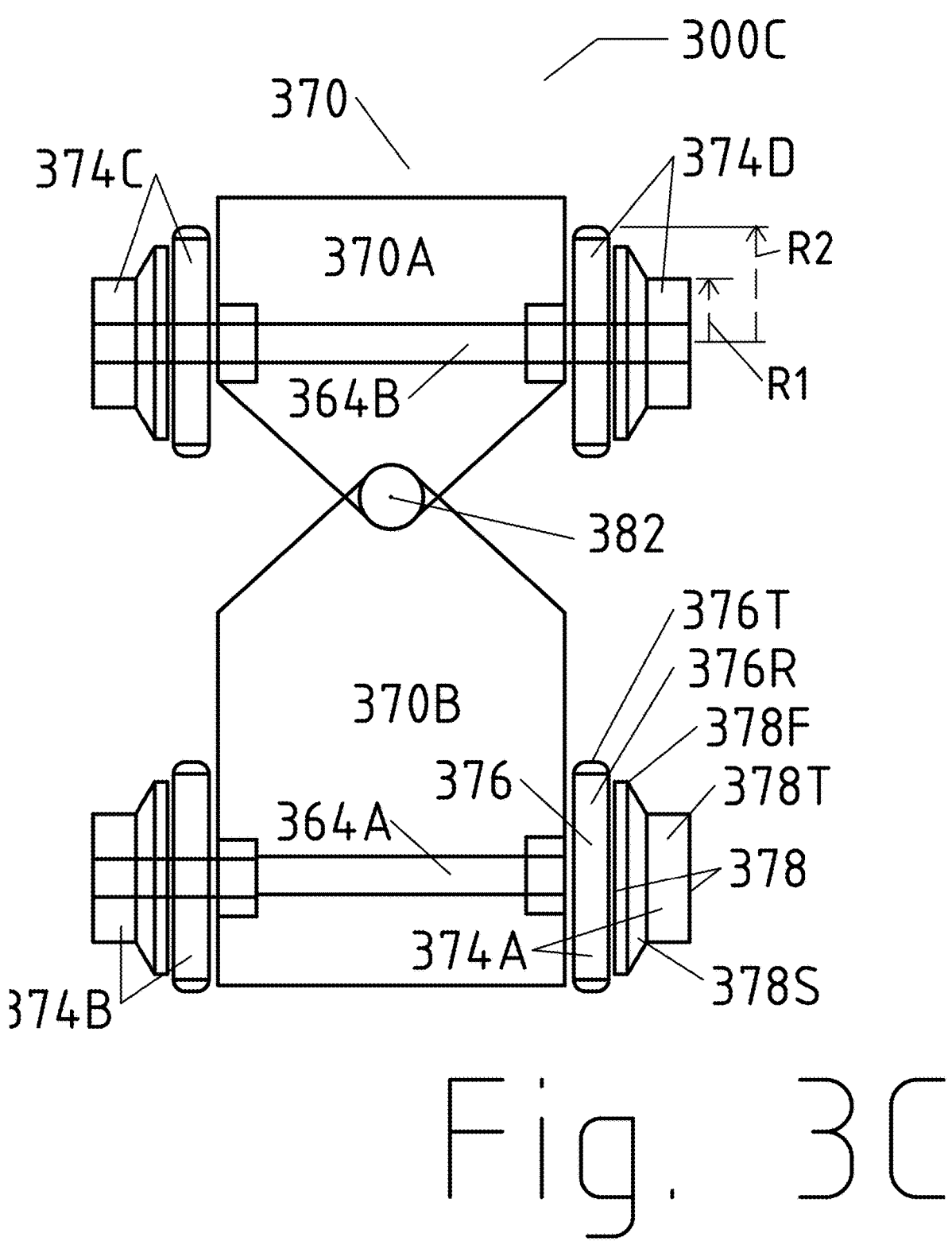
FIG. 3C is a top view of a steerable H-vehicle with four combination wheels.

FIG. 3C is a top view 300C of a steerable H-vehicle 370 with four combination wheels 374A-D. The vehicle's chassis has a front part 370A and a back part 370B. The combination wheels 374 have a road wheel part 376 and a rail wheel part 378. The two wheel parts may be concentric and may both rotate around a common axle 364A-B. The road wheel part consists of a rim 376R and a tire 376T, which may be an elastic material such as rubber. The tire 376T may also be described as part of a road wheel tip. The rail wheel part has a tread surface 378T and a flange 378F with a flange side 378S. The flange 378F has the angled side surface 378S for contacting a rail (not illustrated). Note that a radius of a road wheel's tip is a larger R2, but the radius of a rail wheel's tread is a smaller R1. If the parts rotate together the combination wheel may be said to be locked. When transitioning from road travel to rail travel a locked combination wheel must change angular velocities quickly, possibly causing slippage. This can be remedied by unlocking them and allowing them to rotate at different angular velocities as will be illustrated in a later figure.

On a combination wheel, a road wheel tire 376T is part of a road wheel tip suitable for traction on roads.

Because the road wheel part of a combination descends below the track top surfaces while mounted on a track, this machine is not suitable for trolley service (a.k.a. street cars in the USA) where the rack surface is level with the road surface. For trolley service the embodiments of 3A, 3B and 3D should be considered. Rails crossing roads are also a design consideration for combination wheels.

DESCRIPTION FIG. 3D

Figure 3D:
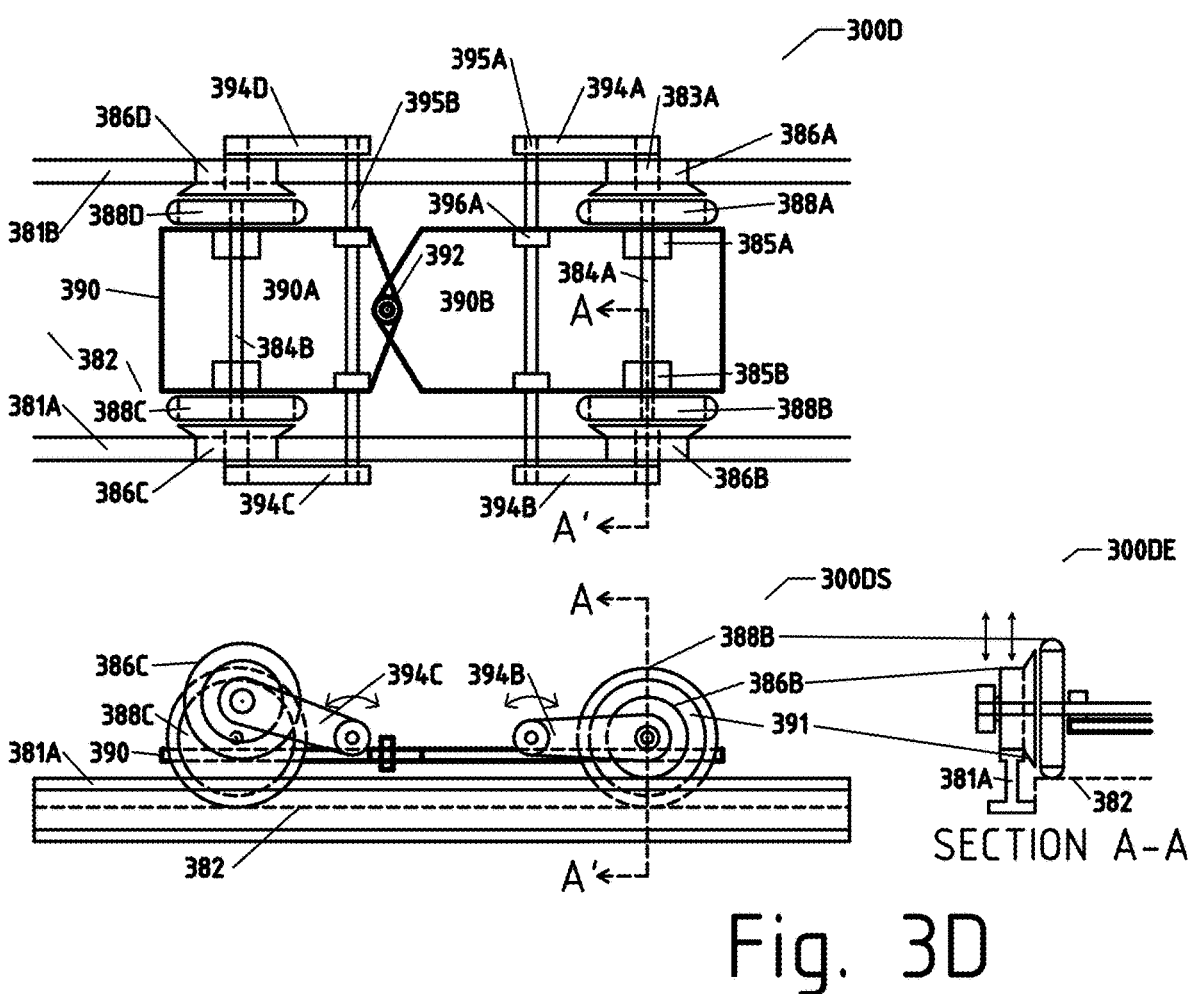
FIG. 3D are top, side, and sectional views of an H-vehicle with four road wheels.

FIG. 3D are top 300D, side 300DS and sectional 300DE views of an H-vehicle 390 with four road wheels e.g.

388A-D. The road wheels are situated adjacent to four rail wheels e.g. 386A-D. The four rail wheels 386A-D are contacting rails 381A and 381B. The chassis front 390A and chassis back 390B rotate around a pivot 392 to steer. Road wheels 388A-D rotate around road wheel axles 384A-B which are connected to the chassis with bearings e.g. 385A-B. Rail wheels rotate around rail wheel axles e.g. 383A. Rail wheel axles are inserted into swing arms 394A-D which connect to lift shafts 395A-B. The lift shafts are connected to the chassis with bushings e.g. 396A.

However road wheel 388A-D and rail wheels 386A-D are not locked. So one wheel set (e.g. rail wheels) can be moved up and down relative to the other wheel set (road wheels) by rotation of swing arms 394A-D. This allows road or rail wheels to contact support surfaces at different vertical levels.

For the sake of illustration, in the side view 380DS the front swing arm 394C axle has been rotated to lift front rail wheels 386C-D off of the rail, so the front of the H-vehicle is being supported by 2 front road wheels 388C-D contacting a rail floor 382.

Rotational speed may be programmed to avoid wheel skidding or slipping when rapidly transitioning from road to rail or rail to rail junction. Methods for driving wheels is not illustrated, but motors can be placed inside wheels, or they may be driven by chains, belts, or pulleys. Likewise actuators that rotate the swing arms or steer are not illustrated.

Front and rear swing arms can be rotated separately.

Sectional view 380DE illustrates an end view of half of a vehicle, a rail 381A and a rail floor 382. Also illustrated are flange side 391 in contact with an edge of the rail 381A, road wheel 388B, and rail wheel 386B.

Optionally, the rail wheels can be raised for road travel or lowered fully for rail travel or for a road crossing. Also rail wheels can be lowered for trolley service. At the end of the rail, the rail wheels can be lifted allow the trolley to operate like a bus using road wheels A-D.

When traveling on the rail, the rail axle can be raised slightly to force the road wheel 388A-D to contact the rail floor 382. This can be done to improve traction to help climb steep hills or provide better breaking than what would be possible with steel rail wheels contacting steel rails. Rail floors may be placed between rails only where a traction need is anticipated. A rail floor should not interfere with water drainage from the tracks.

Traction and breaking can be applied to road wheels, rail wheels, or both.

Alternately, road wheel part can be situated outside of rail wheel parts. This would require the road wheels to be in an elevated or up position while passing through a junction to avoid road wheels hitting a rail. However this embodiment could still use a transition span to mount a rail, but it would require another diverter means beside steering to generate lateral force on a rail. An H-vehicle could choose its own outlet rail if using the rail junction illustrated in FIG. 2A.

DESCRIPTION FIG. 4A

Figure 4A:
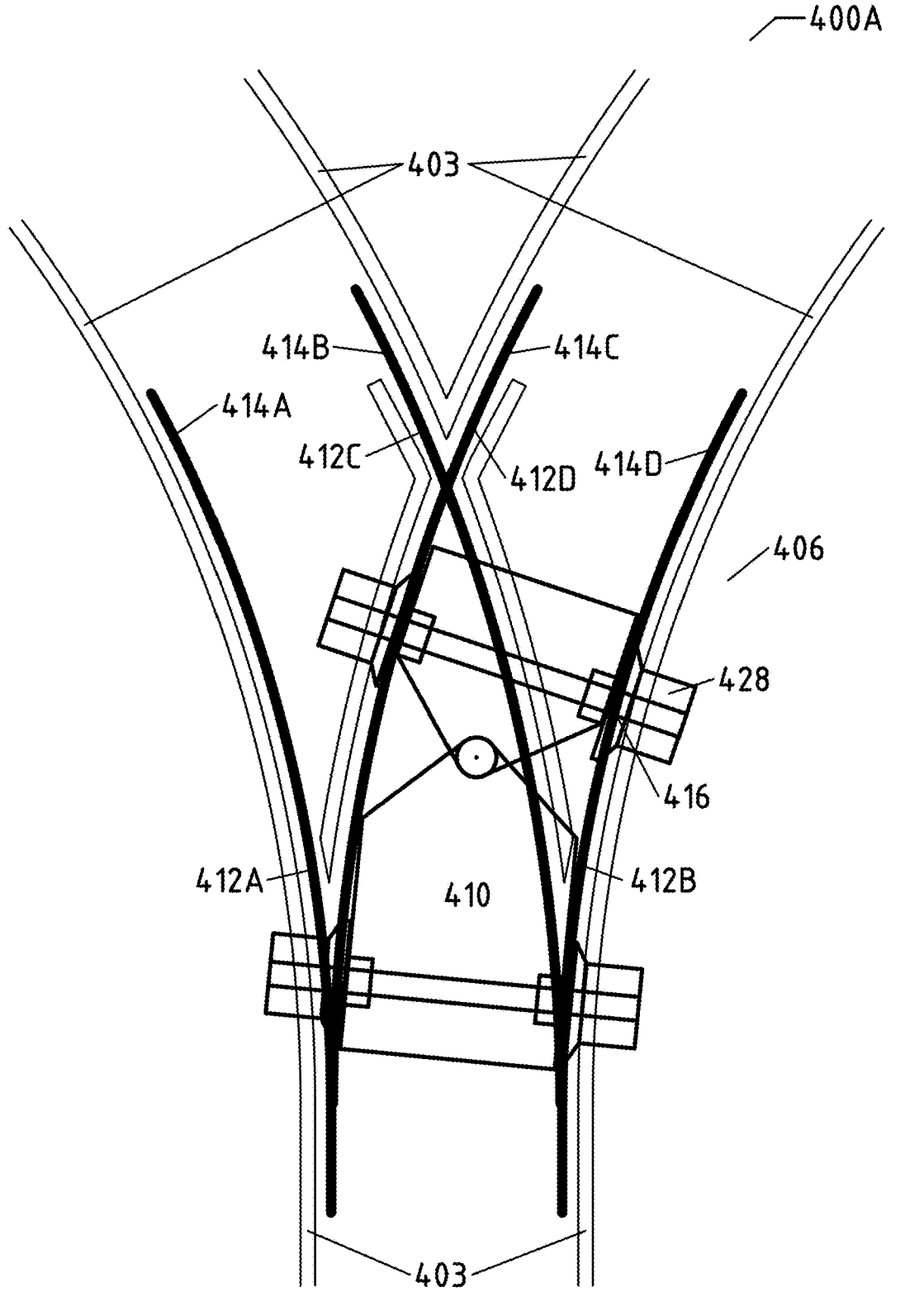
FIG. 4A is a top view of a passive six rail junction with optional flange support surfaces and a vehicle.

FIG. 4A is a top view 400A of a passive six rail junction 406 with optional flange support surfaces 414A-D and a vehicle 410. The four wheel R-vehicle 410 is making a right turn by applying lateral force. This is similar to the vehicle of FIG. 2A mounted on the track of FIG. 3A. Side (or lateral force) is generated by steering while going into a turn. Traction is applied to rail wheels, and steering is accomplished by changing an angle between the front axle and the rear axle. The flanges on the rail wheels pass through rails via flange paths.

The tread e.g. 428 of a rail wheel can be wide, as illustrated, or narrow. A wide tread will prevent a rail wheel from dropping into a rail gap 412A-D. If the tread is narrow the rail wheel can drop into the rail gaps. The flange support surfaces 414A-D can prevent rail wheels with narrow tread from dropping while passing over rail gaps. The flange support surface contacts rail tips 416 for support. The top of a flange support surface is situated below the rail tops. These support surfaces are currently used in frog portions of active rail switches.

DESCRIPTION FIG. 4B

Figure 4B:
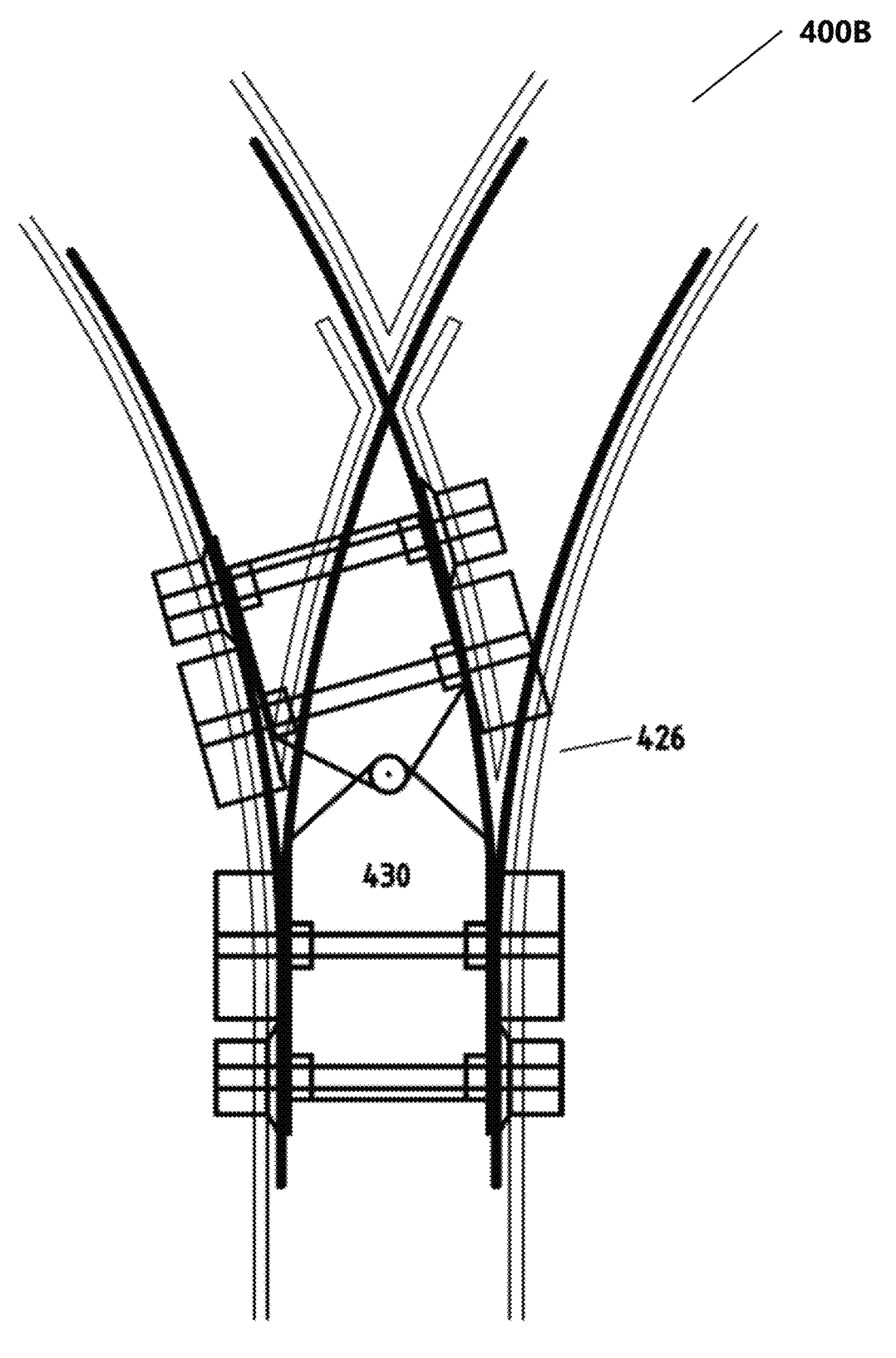
FIG. 4B is a top view of a passive six rail junction with an eight wheel H-vehicle making a left turn by applying lateral force.

FIG. 4B is a top view 400B of a passive six rail junction 426 with an eight wheel H-vehicle 430 making a left turn by applying lateral force. This illustrates the vehicle of FIG. 3B illustrated on the track of FIG. 2A. This junction 426 can be the same as illustrated in FIG. 4A. Rail wheels in the front and back are lowered to keep the vehicle on the track. The side or lateral force is generated by steering while going into a turn. Traction can be supplied by all or just some of the rail wheels in contact with the rail. Alternately, road wheels can contact the tops of the rails and also provide traction or improve breaking. Generally, any road wheels not supplying traction are elevated to reduce rolling resistance. On the road, this hybrid rail vehicle rides on road wheels with its rail wheels elevated. The flange support surfaces may optionally support narrow flange rail wheels to prevent rail wheel drop while going over a rail gap.

DESCRIPTION FIG. 4C

Figure 4C:
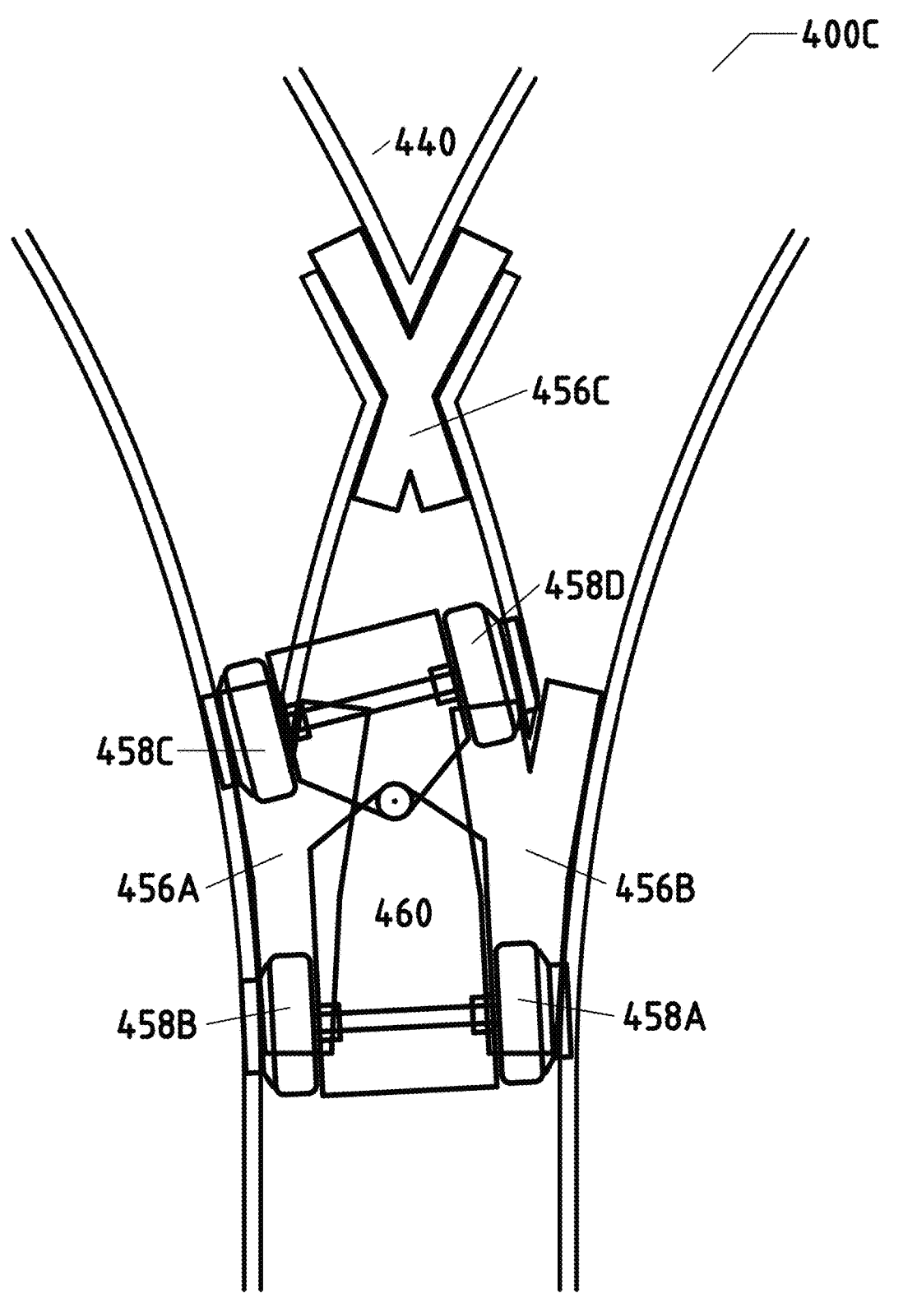
FIG. 4C is a top view of a passive six rail junction with four wide road wheel tip combination wheels passing through wide flange paths.

FIG. 4C is a top view 400C of a passive six rail junction 440 with four wide road wheel tip combination wheels 458A-D passing through wide flange paths. This track is similar to the track illustrated in FIG. 2B, except flange path dashed lines have been removed for illustration. An H-vehicle 460 is similar to the vehicle in FIG. 3C. The H-vehicle 460 has four combination wheels 458A-D with narrow tread and wide tires (road wheel tips). Its tires are supported by flange support surfaces 456A-C in the junction. The upper and lower flange support surfaces may optionally be connected. Flange support surfaces go down (sink or descend) outside of the junction.

DESCRIPTION FIG. 4D

Figure 4D:
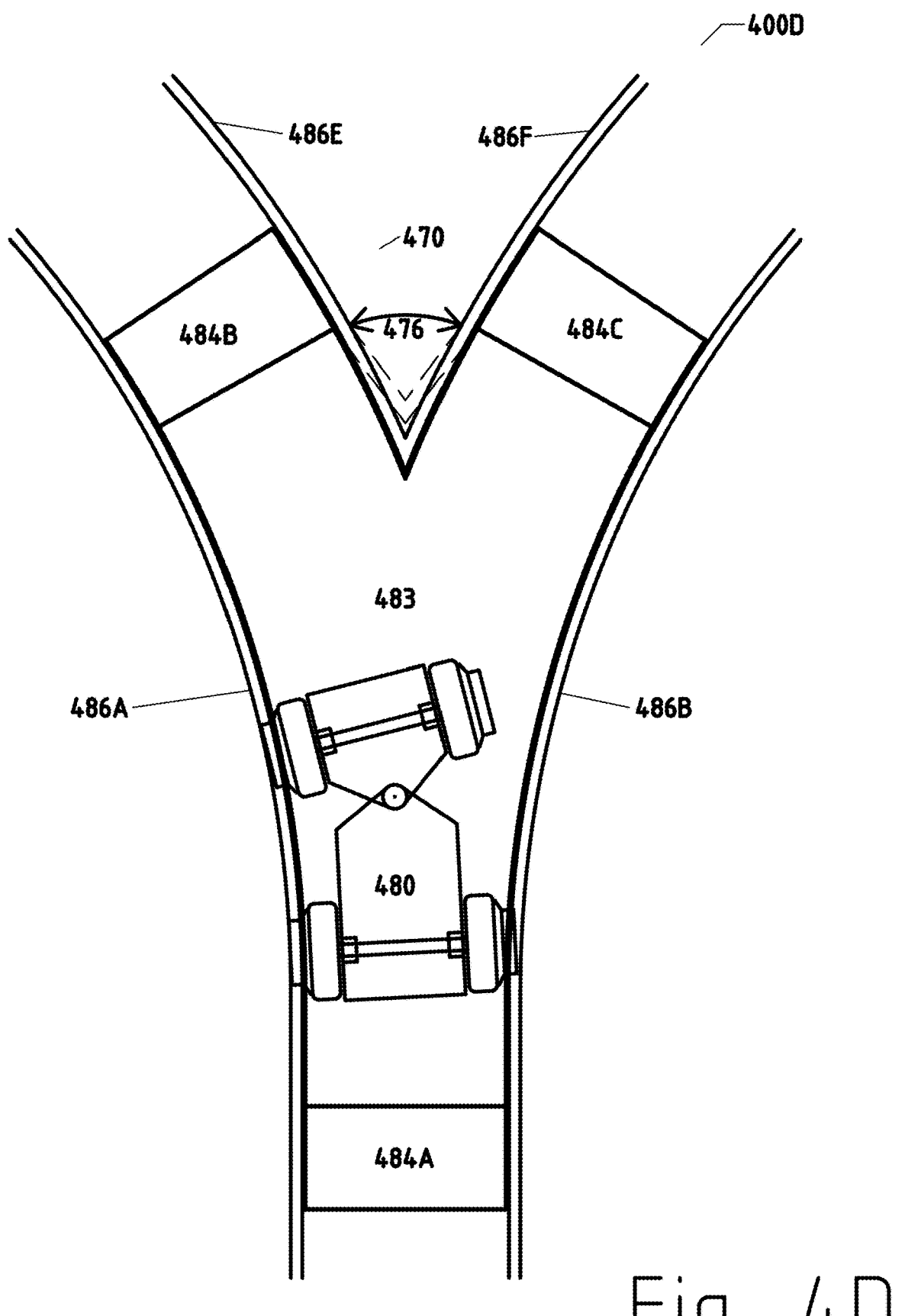
FIG. 4D is a top view of a passive four rail junction with a four combination wheel H-vehicle making a left turn.

FIG. 4D is a top view 400D of a passive four rail junction 470 with a four combination wheel H-vehicle 480 making a left turn. Rails are an alpha rail 486A, a beta rail 486B, an epsilon rail 486E and a zeta rail 486F. The junction 470 is similar to the junction illustrated in FIG. 2C. Junction 470 has a junction floor acting as a flange support surface 483 but does not have gamma and delta rails. The tire (road wheel tip) of the four combination wheels are in contact with the junction floor 483 below, and the left flange sides are in contact with the alpha rail 486A. The junction floor 483 is situated below the rail top surfaces by a distance that is slightly less than the flange height. Contact with the alpha rail is maintained by H-vehicle steering to the left. Up and down ramps 484A-C are illustrated.

It is important to keep the H-vehicle's wheel flanges in contact with the alpha rail during a right turn to avoid one front wheel going left while the other tries to go right at a rail point. Where the epsilon and zeta rails meet, a point angle 476 can be made larger to accommodate imprecise H-vehicle alignment or positioning. This is shown with dotted lines. H-vehicle misalignment could be caused, for instance by ice, high wind, sensor malfunction, or bad driving.

DESCRIPTION FIG. 5A

Figure 5A:
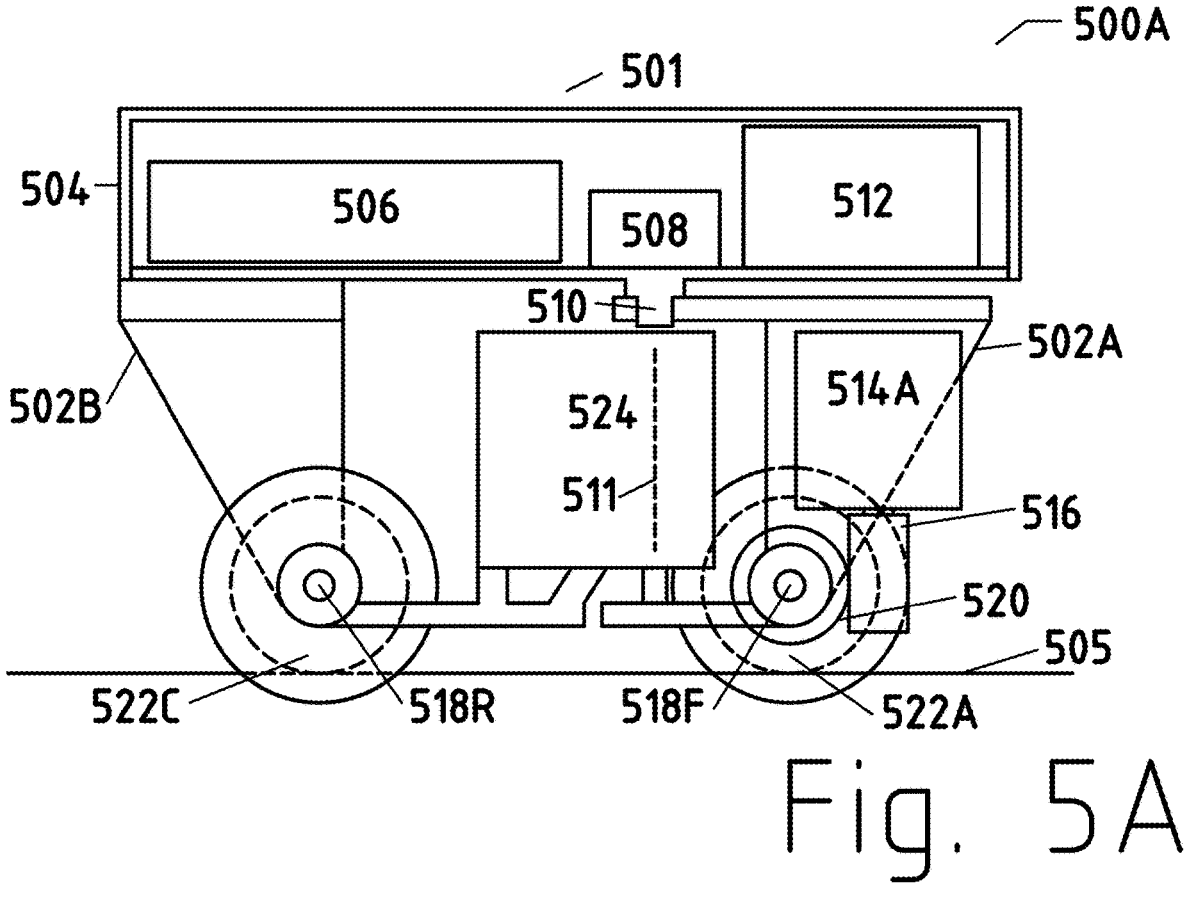
FIG. 5A is a sectional side view of a four wheel R-vehicle with rail wheels intended for rail-only use.

FIG. 5A is a sectional side view 500A of a four wheel R-vehicle 501 with rail wheels intended for rail-only use. This vehicle may ideally be used with the junction illustrated in FIG. 2A, but it can also be used with all others. The drawing is for a model scale application and can be used for demonstration, but mechanics also apply to any scale, including full-scale. The model was sized for G-scale tracks. The section cut was made down the center of the vehicle front to back.

The vehicle 501 is riding on a rail top surface is 505. The vehicle consists of a front chassis 502A, a rear chassis 502B, and a top 504. The top 504 contains a battery 506, a radio control receiver 508, a top pivot pin 510 located on a pivot line 511 and a motor controller 512. Mounted to the front chassis 502A is a brushless motor 514 with a worm gear 516, and a front axle 518F. The front axle mounts a gear 520, and two rail wheels 522A-B (522B not illustrated).

Mounted to the rear chassis 502B are the top 504, a steering servo motor 524, a rear axle 518R.

If this vehicle is taken off of a rail, it can run on a flat road surface on the rail wheel, supporting itself on the wheel's narrow road wheel tips. However traction tends to be poor and its narrow road wheel tips can damage a pavement.

This R-vehicle that has articulated steering with chassis sections 502A and 502B rotating around the pivot 510. The servo motor 524 provides steering with rotation around the pivot line 511 which is aligned vertically. The vehicle can operate on rails with passive junctions by applying lateral force which is generated by steering. The rail wheels have a flange portion with an optionally wide tread. A small radio control receiver is illustrated for radio and servo control, alternately an ESP32 computer can be used and the vehicle can be controlled with Wi-Fi or Bluetooth. One channel is used for steering, one is used for speed control.

There are two options for rail wheel tread width. If tread width is wide, as discussed in U.S. Pat. No. 11,364,940, the junction illustrated in FIG. 2A can be used without raised flange support surfaces. If the rail wheels do not have wide tread surfaces, the flange support surfaces illustrated in FIG. 2A can prevent rail wheels from dropping into flange gaps by supporting the wheel tips.

DESCRIPTION FIG. 5B

Figure 5B:
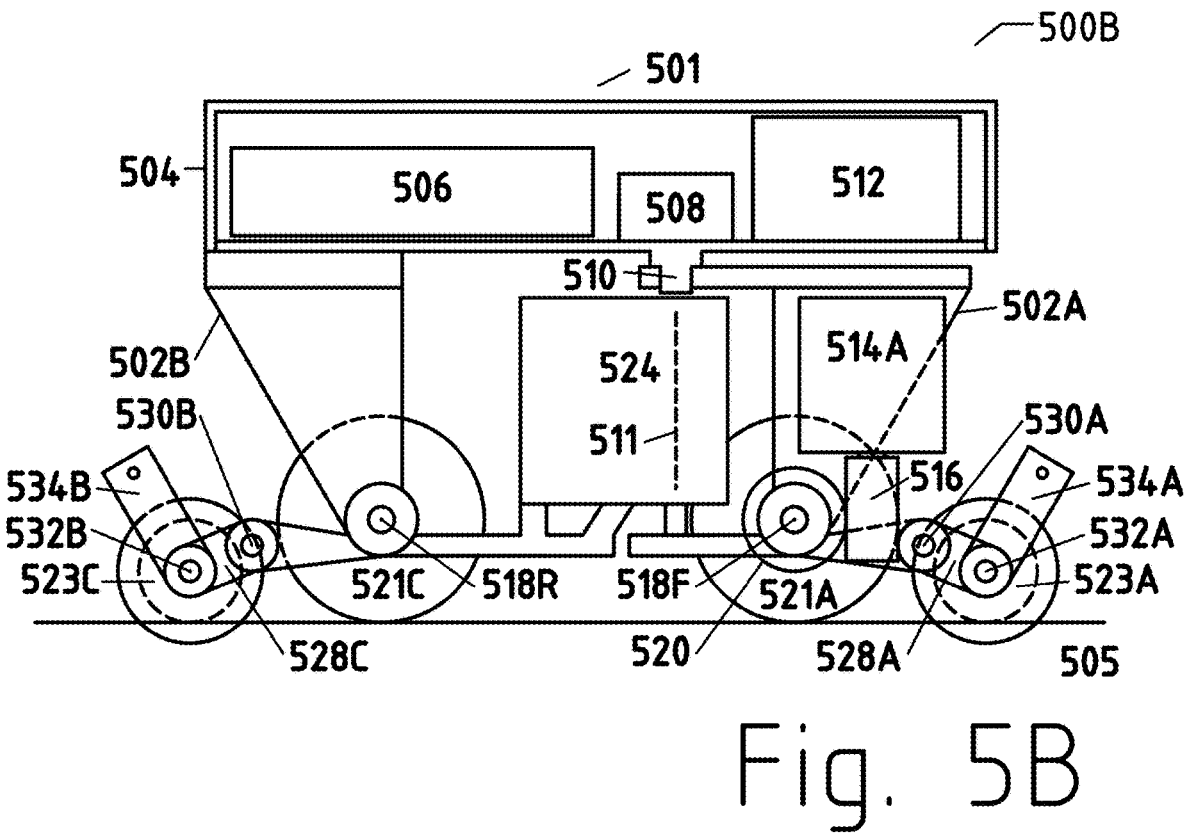
FIG. 5B is a sectional side view of an eight wheel H-vehicle with steering that is used for both rail and road travel.

FIG. 5B is a sectional side view 500B of an 8 wheel H-vehicle with steering that is used for both rail and road travel. This vehicle can be used with the junction illustrated in FIG. 2A. The H-vehicle has separate road wheels and rail wheels. It contains most of the same elements of FIG. 5A except the rail wheels 522A-D have been replaced with road wheels 521A-D (521B and 521D not illustrated) and swing arms 528A-D raising and lowering rail wheels 523A-D. The swing arms 528A-D pivot around pivot axles 530A-B which are attached to the chassis halves 502A-B. Rail wheels rotate around rail wheel axles 532A-B which are attached to the swing arms 528A-D. Swing arm actuator motors (not illustrated) are attached to pivot arm levers 534A-B.

H-vehicle 501 is illustrated as riding on a rail 505 with rail wheels 523A-D (523B and 523D not illustrated) lowered by swing arms 528A-D. The road wheels 521A-D are riding on top of rail 505. Articulated steering is accomplished by a servo motor rotating chassis haves around a vertical pivot line 511. The four rail wheels are lowered using a pair of swing arms rotating around horizontal pivots. Rail wheels are lowered when the vehicle is on the track and elevated when the vehicle is on the road. Two separate servo motors are used on the model to raise and lower the rail wheels. These servos are not illustrated. Rail wheel pairs may be raised and lowered together or separately. Traction on rails can be provided by allowing road wheels to contact the tops of the rails, as illustrated, or rail wheels can be driven. Alternately, traction can be applied to both rail and road wheels. Two or four wheel drive can be used.

DESCRIPTION FIG. 5C

Figure 5C:
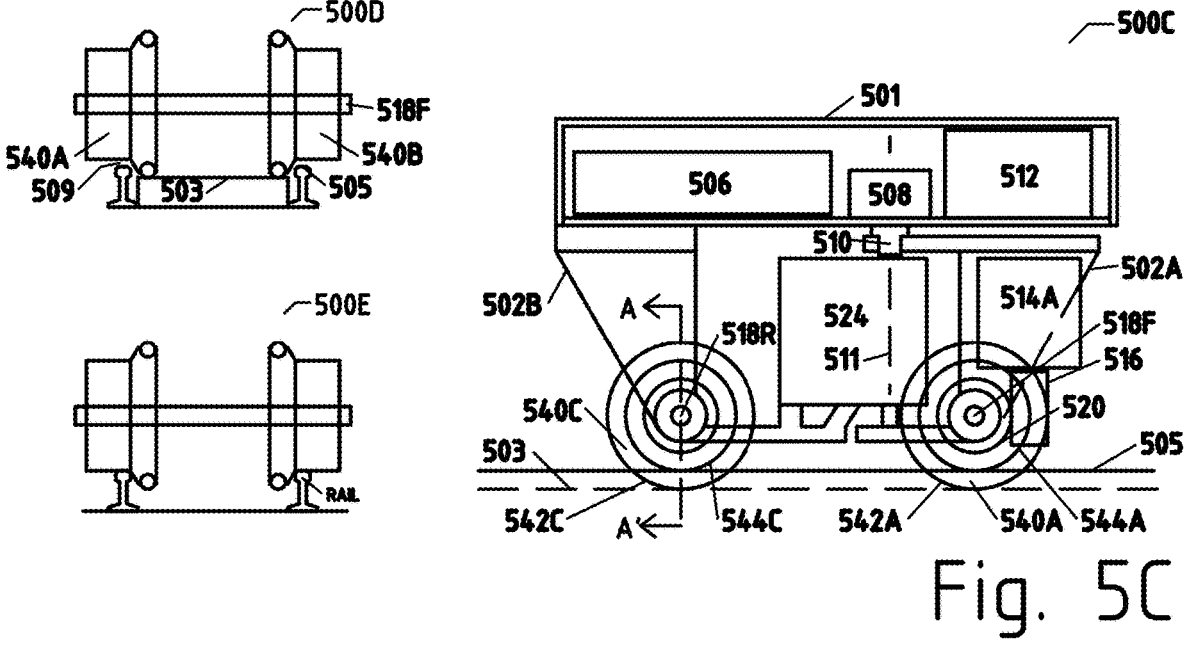
FIG. 5C are side and section views of a four wheel H-vehicle using combination wheels and riding on rails.

FIG. 5C are side and section views 500C of a four wheel H-vehicle using combination wheels 540A-D and riding on rails. The vehicle is similar to FIG. 5A except for the combination wheels 540A-D are used in place of rail wheels 522A-D. Combination wheels 540A-D (540B and 540D not illustrated) have rubber wide road wheel tips 542A-D and hard tread surfaces 544A-D.

Two sectional A-A' views are taken. View 500D illustrates the vehicle being supported by a junction floor 503. View 500E illustrates the vehicle being supported on rail 505. The left top sectional view 500D illustrates the combination wheels receiving support from the junction floor 503. Note the small gap 509 between the rail and the rail wheel tread. The left lower sectional view illustrates the tread on combination wheels getting rail support with the road wheel tips (tires) unsupported.

DESCRIPTION FIG. 5D

Figure 5D:
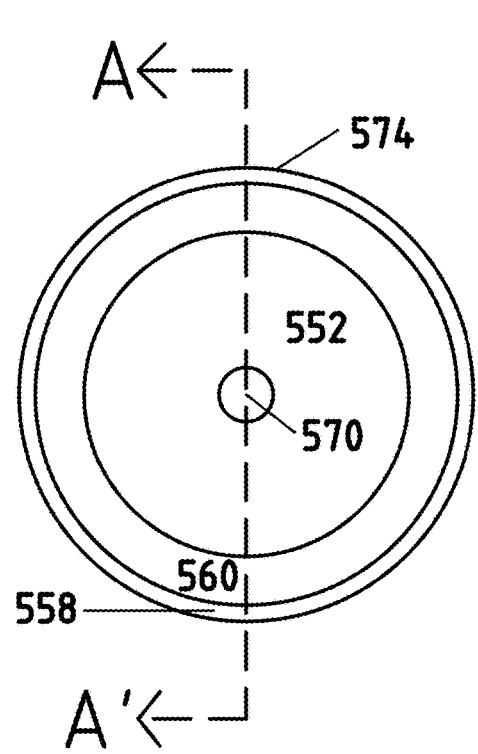
FIG. 5D are side and section views of a locked combination wheel.
Figure 5D:
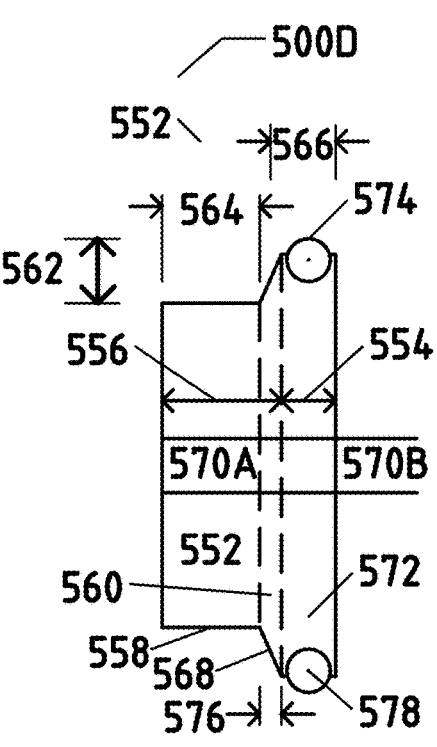

FIG. 5D are side and section views 500D of a locked combination wheel 552. The combination wheel 552 has road wheel parts that rotate at a same angular velocity as rail wheel parts and are concentric. The figure illustrates the simple rail combination wheel 552 that has two parts. There is a road wheel part 554 and a rail wheel part 556. The road wheel part 554 has a rim 572 and a flange tip with a tire 578. It can also be called a road wheel tip 574 and can be rubber or made of whatever material is located on the top or bottom of a road wheel. The road wheel part 554 has a road wheel width 566.

A rail wheel part 556 has a (slightly tapered) cylindrical part called a tread 558 with a width 564 and a flange 560. The flange has a height 562, a flange width 576, and an angular surface 568. An axle 570 can be considered to have two parts, a rail wheel axle 570A and a road wheel axle 570B. In this figure they are locked together.

This road wheel part 554 does not damage pavement because of the tire 578 on the road wheel tip. The angled flange surface 568 makes contact with the inside of a rail or a side bar on a transition span or a junction to generate lateral force. The tread width 564 may be wide or narrow (conventional). A wide thread is used to prevent a rail wheel from dropping into a rail gap by receiving support from an adjacent rail top. When an elevated flange support surface is used, the tread may optionally be narrow because wheel support is provided by an elevated flange support surface contacting the road wheel tip (tire). Likewise the tread width 564 may be wide or narrow, depending on application.

Thus a combination wheel has a road wheel part and a rail wheel part. On a road, in a transition span or in a junction, the road wheel tip supports the vehicle. On a rail, the tread of the rail wheel provides vehicle support.

DESCRIPTION FIG. 5E

Figure 5E:
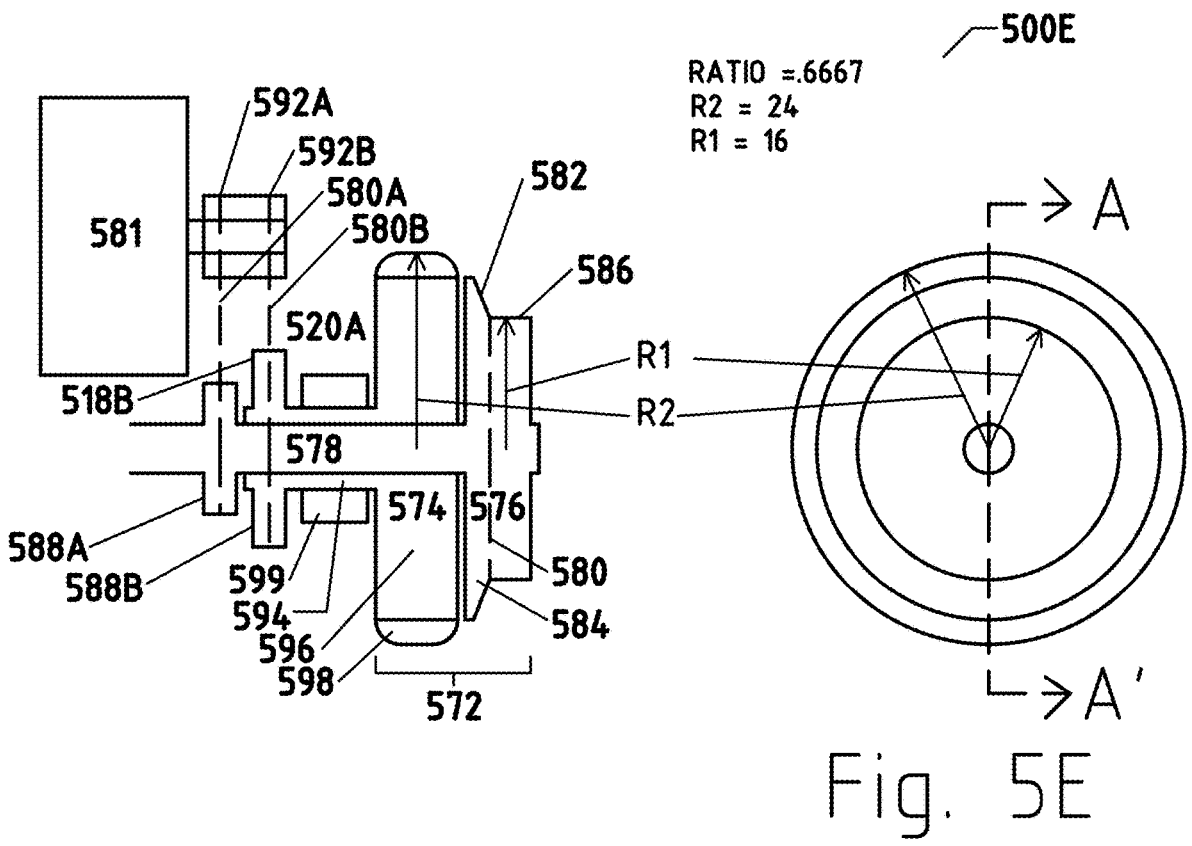
FIG. 5E are side and sectional views of an unlocked combination wheel.

FIG. 5E are side and sectional views 500E of an unlocked combination wheel 572. The purpose of an unlocked combination wheel is to allow a road wheel tip 598 to rotate slower than the rail wheel tread 576, avoiding skidding or slippage when moving into or out of a junction. A central shaft 578 supports a rail wheel 580 with a flange 582 having an angled flange side surface 584 and a tread 586. The central shaft also mounts a pulley A588A connected with a belt or a chain 580A to a left motor pulley 592A. The pulleys' belts are illustrated as dashed lines. The central shaft 578 is inserted into an outside shaft 594 to which a road wheel rim 596 is attached. The rim mounts a tire 598 (road wheel tip) made of elastic material. The central shaft 578 also mounts a pulley B 588B which is connected to a right motor pulley 592B via a belt or chain 580B.

The outside shaft 594 is supported by a bearing 599 which is attached to a chassis or suspension, not illustrated. A variable speed reversible motor 581 rotates the motor pulleys. Because pulley 1 and pulley 2 have different diameters, the outside shaft rotates 594 at 0.667 times the rotational velocity of the central shaft 578. Note that required angular velocity ratios depend on wheel sizes and how far the junction floor is located below the rail top surface. Two vehicles with different ratios between R2 and R1 should use different gear teeth ratio sizes or pulley size ratios for a same junction.

This embodiment may also be implemented with gears in place of belts or chains. Also motors and gears can be located inside a combination wheel.

Other methods of making an unlocked combination wheel include separate motors on road wheel and the rail wheel parts, freewheels, planetary gears, and clutches.

On a planetary gear, the ring may be driven, the sun gear locked (or fixed or held) and the planet carrier is used for a reduced speed takeoff, which is the road wheel.

A single motor with two output shafts can also be used. The two shafts can be coupled mechanically (e.g. with gears) or they can be coupled magnetically. For example, one output shaft can use four poles in the rotor and the other can use six poles in the rotor while rotating inside a same stator.

Use of a freewheel would allow a road wheel to decelerate faster when it contacts a junction floor.

A clutch would allow road and rail wheels to be decoupled when their rotational velocity diverges.

If a brushless motor is used on a locked combination wheel, another technique is to very rapidly change the drive frequency to the motor when rotational speed needs to rapidly change. A motor controller can be sent a "speed-up" or "slow-down" signal from a junction sensor. Motors can be either radial or axial flux designs.

Generally if wheel slip is going to occur on locked combination wheels, steel-to-steel slip is preferable to rubber on cement because you do not want to leave rubber on a junction's pavement. Both the road and rail wheels will tend to slip when first providing support for a vehicle.

Another method of eliminating skidding is to put a roller at the entrance and exits to a junction in place of an up-ramp. The roller is situated at right angles to the direction of R-vehicle travel. A locked wheel vehicle arriving into a junction can reduce its locked combination wheel's speed while the vehicle is supported by the roller.

Another method of eliminating skidding is to use a flexible driveshaft, such as one containing a torsional spring.

As a wheel decelerated the spring would absorb energy and give the energy back when accelerating.

A differential gear set can be used between a drive shaft, a road wheel and a rail wheel if the road wheel is in contact with the road, the rail wheel is in contact with the rail. A limited slip differential may be used.

DESCRIPTION FIG. 6

Figure 6:
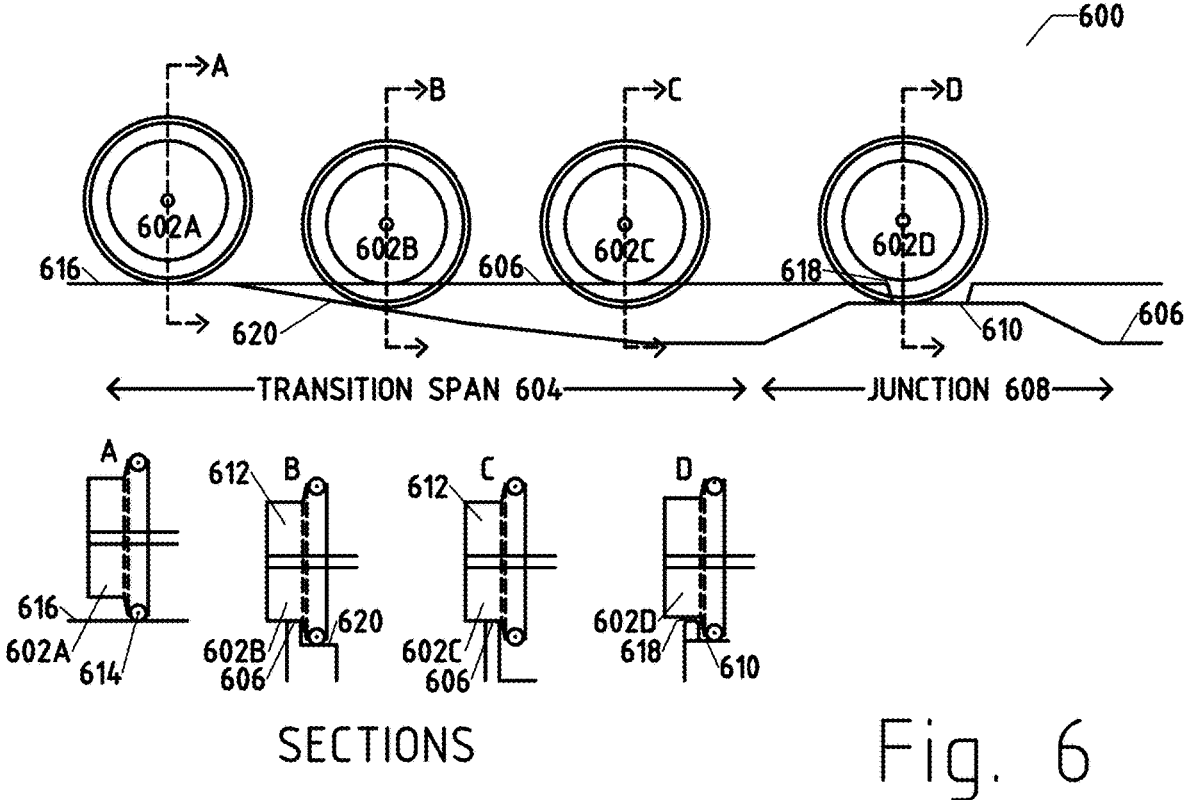
FIG. 6 is set of four side and four sectional views of a moving combination wheel.

FIG. 6A is set of four side and four sectional views 600A of a moving combination wheels 602A-D. The combination wheel is going from a road 616 to a transition span 604 onto a rail 606 and then passing over a junction 608 with a junction floor 610. On the left are four side views of the locked or unlocked combination wheel 602A-D mounting the rail on the transition span 604 by moving to the right. In position A the wheel 602A is traveling on the road 616 and the vehicle's weight is supported by the rubber tires comprising a road wheel tip 614.

In position B the wheel 602B is transitioning onto the rail 606 and the vehicle's weight is transferring from being supported by a transition span floor 620 and rubber tires 614 to being supported by the rail 606 and tread portion 612 of the (steel or other material) rail wheels. This is where slippage may occur for a locked combination wheel.

In position C the rail 606 and rail wheel treads 612 are supporting the weight of the vehicle. The known disadvantage of this combination wheel is the different relative speeds between the road wheel tip and the tread, which causes slippage when getting onto or off of a rail if using a locked combination wheel.

In position D the wheel 602D is passing through a junction and the road wheel is lifting the rail wheel slightly off of the rail a small distance "gap" 618, which may be less than 1 cm. for full scale. There will also be a slight wheel elevation change which may be concealed by a vehicle's suspension. Another option is to have the vehicle travel level and have the tops of the rails in a transition span go up and down to avoid a combination wheel's elevation change.

Transition Spans

Figure 7C:
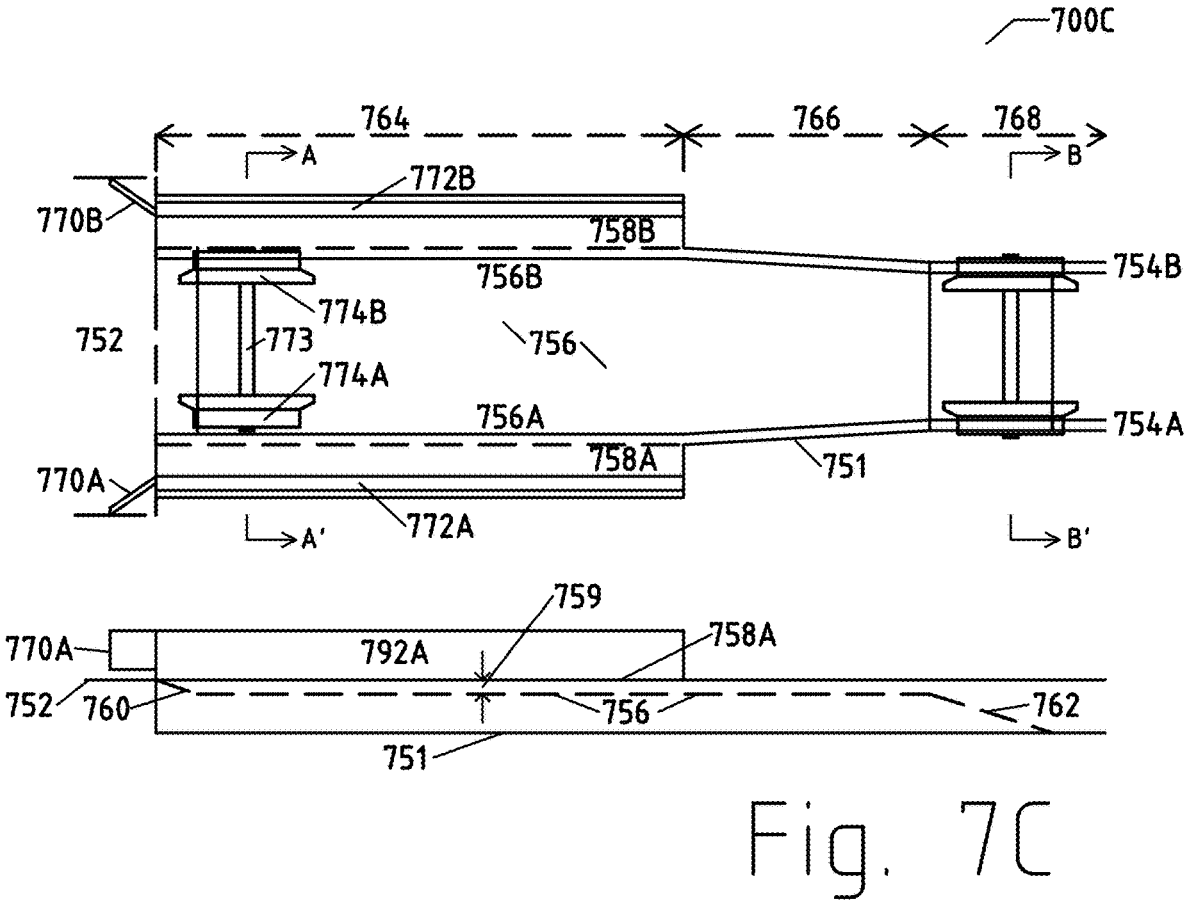
FIG. 7C are top and side views of third mechanical transition span.

A transition span connects a road, which is essentially a flat surface and two rails with standard gauge spacing. With a current state of automobile vehicle steering technology and developments in machine vision, lasers, sensors, guide wires, LIDAR, digital signal processing (DSP), microwave signals, computers, and digital communications, transition spans may be used that electronically guide an H-vehicle onto a set of tracks. Illustrated in FIG. 7A is an H-vehicle that simply steers as it moves forward to mount a rail. Or as it backs onto a rail, for that matter. This may be implemented with a set of rails that simply rise up out of a road or sink back into a pavement. In this application, a transition span's function is to provide a safe location to mount a rail without cross traffic interference and preferably without stopping. Mechanical guide systems are also illustrated in FIGS. 7B and 7C. In connecting to a rail, fishplates or metal connecting bars may be used to attach a transition span structure to the rails.

DESCRIPTION FIG. 7A

FIG. 7A are top and side view 700A of a first electronic assist transition span 711. The span has been shortened for illustration. The transition span 711 can be used to electronically connect a road 702 and a conventional set of tracks 704 using a vehicle's steering using pivot 708 for combination wheel 718A-D alignment. This embodiment can be used with the vehicles illustrated in FIG. 3A, 3B, 3C or 3D. Vehicles are mounting rails 712A and 712B by moving to the right. The combination wheels 718A-D steer to align a left H-vehicle 710A with the set of rails 712A and 712B that are rising out of a ground surface (road) 702, which can be pavement. Sleepers (railroad ties) have been omitted for clarity. The transition span 711 connects to rails 712A-B at rail joint 713. Two or four wheel steering can optionally be employed on the H-vehicle 710A. Any type of steering can be used, including crab steering. The front wheels of the left H-vehicle 710A are illustrated as over sunken rail tops, while the rear wheels are still on the ground surface road 702. A right H-vehicle 710B is fully mounted on the rail. The left H-vehicle 710A steers using left and right indicator signals 714L-714R in a feedback system as well as distance-to-mount reflectors 728L-R. The signal also indicates deviation-from-centered distances.

Multiple alignment systems are illustrated and discussed.

In a first method, machine vision alignment is used employing camera 716 and computer 724. The camera 716 is mounted on the vehicle looks and is pointing forward, specifically looking for target signals from positions such as the indicator signals 714L-R. The two signals radiate electromagnetic energy at any wavelength. For example, the signals can be one or two light sources (e.g. visible or invisible LEDs or pulsed LEDs) or light from illuminated retro-reflectors 728L-R. The signals are observed by the camera 716 situated on H-vehicle 710A. When the H-vehicle is maneuvered into a correct position, the two lights will be in a correct alignment position in a camera's image, and the rail wheels will be correctly aligned. Use of one or more lights allow adjustments on angle (bearing). Distance can be measured by LIDAR. Retro-reflectors such as the reflectors 728L-R can be used to increase the range of LIDAR which can accurately range distance. When LIDAR is used for distance, and a light separation angle is measured with a camera, both distance and angle is known for positioning.

Machine vision may also be used to identify and track the rails below and ahead.

In a second method a magnetic probe 726 mounted on the front of a vehicle is sensing an AC magnetic field sent out by a sensor wire 720 situated between tracks. The magnetic field can be created by a current loop with current going out the wire and returning through the rail 712A. The current loop can extend out into the road for vehicle pickup at a distance. This principle of operation is used by technicians to locate underground utilities that conduct, such as water pipes, gas lines, or AC power lines. An AC frequency should not be a harmonic of any power source, especially 50 or 60 Hz. The magnetic probe 726 can use Hall effect sensors to discern magnetic field vector direction and strength.

In a third method, an antenna 722 can be receiving radiated Geo-location signals from a stationary local site signal source (not illustrated). A computer 724 can process the signals and provide steering/driving commands. The antenna and computer can also process command and control communications with a remote TCS (not illustrated). The radiated geo-location signal source can service multiple nearby transition spans.

In a fourth method a pair of directional radio signals can be used, such as are used by aircraft instrument landing systems (ILS). Two amplitude modulated (AM) carriers with a same carrier frequency and different modulating frequencies, such as 90 Hz and 150 Hz, are used in overlapping beams. Reception of the beams tell a receiving antenna on the vehicle it is headed directly towards a target rail or if is to the left or right by the relative amplitudes of the AM side-bands. Radio carrier frequencies should be much higher than aircraft applications because a range is much shorter and higher precision is needed. A frequency in the tens of giga-Hertz is appropriate, plus directed beam forming can be made tighter at microwave frequencies with short wavelengths. A receive antenna is located on the H-vehicle and transmit antenna(s) (not illustrated) with beam forming are located ahead of the H-vehicle. Phased arrays may be useful for beam forming. Beams may also be multiplexed in the time domain. The beams may use suppressed carrier signals.

In a fifth method a laser beam shines down the track for vehicle alignment. The H-vehicle would simply keep the laser beam in the center of sensor optical cross-hairs as it moves forward. The laser could be located between the rails or over a rail, but snow/ice buildup is a design consideration.

A sixth method can achieve alignment when a first laser beam shining down from the vehicle 710A is reflected from a rail top while an adjacent laser beam misses the rail top and hits the ground to the left or right.

In a seventh method, one or plural retro-reflectors in an array can be placed ahead on the track and used as an alignment target by lasers on the vehicle. The lasers can be part of a LIDAR scanner.

In an eighth method, magnetic sensors on the vehicle can be placed above the steel track. These can operate on the principle used by metal detectors where an oscillator changes frequency or a sensing coil's loss increases (Q-factor) in the presence of metal. These detectors can operate around frequencies of 100-300 kHz.

In a ninth system, mechanical or capacitive probes can be used to "feel" or sense the track to change steering.

If there are multiple entry tracks, guide signals may distinguish themselves by frequency or other signal characteristic. Thus, a vehicle can be commanded by a TCS to enter a particular lane or enter a queue.

Systems that allow entry to curved tracks also exist for aircraft flight paths. Design is simplified if H-vehicles can travel straight onto the tracks, not at an angle. Real estate track availability and other design considerations may not always allow this.

In general, radio wave solutions have a design weakness of reflected signals causing interference and misalignment. They can also be attenuated by moisture with higher frequencies being better for accuracy but more sensitive to rain or snow. Magnetic solutions have a weakness to stray ferrous metal causing a distortion of magnetic fields. Optical solutions have a weakness of beam blocking including dirty lenses and snow/ice covering. Track heating has been used in the past to remove snow.

With combination wheels, a road wheel part steers as it moves forward until the rail wheels' flanges engage the tracks. With separate road and rail wheels, the road wheels align the rail wheel flanges over the slot (flange paths) into which they will drop. Using computer-aided vehicle steering in place of a mechanical mechanism to align vehicles with tracks is simpler, but may not be appropriated for some applications, such as third-world countries without advanced technology. It may not be appropriate for seldom-used locations with no available maintenance or power.

The embodiments of FIGS. 7B and 7C both rely on mechanical means for mounting rails. But may be assisted by electronic means.

In another embodiment, rails can run horizontally and road wheel support pavement underneath gradually drops.

Trolley (or street cars) rail tops run at street level. This transition span may also be comprised of roads containing trolley rails to track transition spans.

Where the tracks rise out of the pavement the tracks may be spaced with a slightly larger gauge than standard, by a few centimeters. A conventional flange width rail road wheel will tolerate a slightly wider gauge and automatic alignment is made easier.

The eight-wheeled H-vehicle (e.g. FIG. 3B) can lower its rail wheels as soon as alignment and rail wheel flange clearance above the road is achieved.

The rail tops may flare (become wider) near the ground entrance to facilitate alignment.

In an alternate embodiment, a camera on the transition span can scan an approaching H-vehicle and command it what to do. The commands can be via radio signals to computer 724 or visible signals intended for a human driver.

In the transition span a TCS should securely communicate with an H-vehicle to verify such details as toll payment, sufficient battery charge to reach destination, good mechanical conditions, vehicle not reported as stolen etc.

DESCRIPTION FIG. 7B

FIG. 7B are top and sectional views 700B of a second transition span 731 that can be used to mechanically align a vehicle on a road 732 with rails 734A-B. A road inlet is on the bottom and a rail outlet is on the top. The vertical scale has been compressed for illustration. Only an axle 744 with a pair of combination wheels 742A-B is illustrated. The combination wheels need to be centered to mount combination wheel treads 743A-B onto the tops of rails 734A-B. When moving from the road 732 to the transition span 731 a road wheel tip 736 on the combination wheel 742A-B makes a first contact with a transition span's floor 746. The road wheel tip 736 is illustrated as a rubber tire on a combination wheel 742A-B, but there are other embodiments. For example, a road wheel tip can be wide or narrow, elastic or hard. Road wheel tips can be situated on a combination wheel as illustrated, or narrow and hard as illustrated on the rail wheel in FIG. 3A. A surface of the floor 746 can be manufactured treated to improve traction or heated to melt ice and snow.

The wheel of FIG. 5E also can be used. The eight wheeled embodiments of FIG. 3D and FIG. 3B also works, but the rail wheel part must be lowered before mounting the rails 734A-B. Side bars 740 are first contacted by a wheel's flange angled surfaces 738. This forces the axle and vehicle to a span center so that, as it moves forward, wheels 742A-B align with the rails 743A-B. A small gap 748 between the side bars and the wheels' tread prevents wheel contact with the side bar tops while inside the transition span. As the wheels roll down an optional ramp 747 the rail wheel tips go unsupported, and the treads 743A-B make contact with the tops of the rails 734A-B.

Wide or narrow treads 743A-B may be used on combination wheels 742A-B. Wide treads are not required for a transition span, but are accommodated.

Going from rail to road is just the reverse process. Vehicles can also be backed onto a rail. Vehicles can be steered in a transition span to avoid contact with the side bars, and electronic guidance methods can also be used with electronic transition spans. The transition span 731 can be operated with an up-tilt, a down tilt or level.

Only a single wheel set with an axle with a pair of combination wheels is illustrated. The wheel set has rolled in from the bottom and is resting on a floor and it is not centered, but shifted to the left. The floor is a flange support surface. As the wheel set rolls forward towards the rails, the flanges' angled surfaces contact the insides of side bars forcing the wheel set into center. Transition span 731 is very tolerant of entry vehicle misalignment, both rotational and translational.

DESCRIPTION FIG. 7C

FIG. 7C are top and side views 700C of third mechanical transition span 751. It is used to mechanically align H-ve-hicles coming from roads 752 onto rails 754A-B. The transition span connects to the road 752 on the left and to the rails 754A-B is on the right.

The transition span 751 has a wide gauge section 764, a gauge transition section 766 and a standard gauge section 768

The span 751 has a pair of road wheel support surfaces 758A-B and a pair of flange support surfaces 756A-B. The flange support surface 756A-B is situated below the road wheel support surface 758A-B by a height 759 that is slightly less than a flange height e.g. 562. This transition span can be used by multiple H-vehicle wheel configurations including embodiments illustrated in FIGS. 3A-D and 5E. It is illustrated with an axle 773 and two locked narrow flange combination wheels 774A-B.

A 4-wheel vehicle pulls onto the transition span 751 and the road wheel tip of the combination wheel goes down a first ramp 760 connecting the road 752 to the flange support surface 756 in the wide gauge section 764. At this point a road wheel tip of the combination wheel 774A-B can be supported by the flange support surface 756A-B, or the (wide) tread portion of the rail wheel 774A-B can be supported by the road wheel support surfaces 758A-B. The H-vehicle moves forward into the gauge transition section 766 and is forced into a center. As it leaves the gauge transition section 766 it is aligned. The H-vehicle moves into the standard gauge section 768 and a second ramp 762 drops. This removes support for the road wheel tips and the H-vehicle moves onto rails 754A-B supported by wheel treads.

To assist an H-vehicle's road wheel entering the transition span a funnel 770A-B is provided. To keep 740 road wheels of a poorly-steered vehicle in the transition span 751 a pair of gutters 772A-B are used.

DESCRIPTION FIG. 7D

Figure 7D:
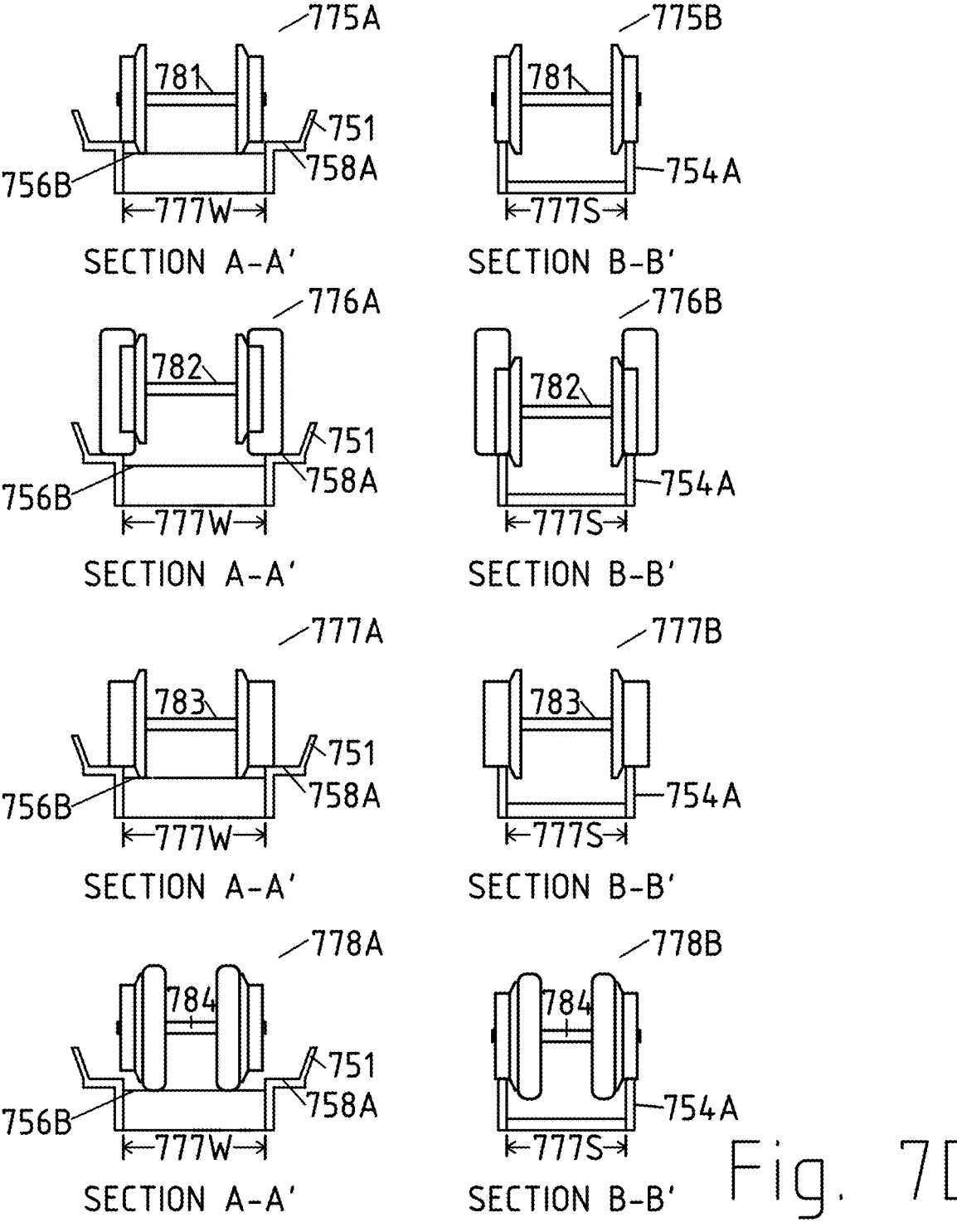
FIG. 7D are eight section views of FIG. 7C showing wheel set positions.

FIG. 7D are eight sectional views 775A-B to 778A-B of FIG. 7C showing wheel set positions.

All H-vehicle wheel embodiments can work with all transition spans, but standards need to be set for interoper-ability, safety, automation, speed, and inclement weather conditions.

A first set of sectional views 775A-775B (A-A' and B-B') illustrates combination wheel sets 781 with narrow flanges and narrow treads. In a wide gauge section 777W the flange tips support the wheels on flange support surfaces 756B. In the standard gauge section 777S the tread supports the wheels on the rails 754A-B.

A second set of sectional views 776A-B (A-A' and B-B') illustrates separate road wheels and rail wheels sets 782. The axle has been omitted from the road wheel set for the sake of illustration. In the wide gauge section 777W the road wheels are supported by road wheel support surfaces 758A-B. In the standard gauge section 777S the treads supports the wheels on the rails 754A-B. One or more road wheels can optionally contact the rail tops to provide traction for acceleration or braking.

An 8-wheel vehicle moves onto the wide gauge section 764 with its rail wheels up. Its road wheels are supported by the road wheel support surfaces 758A-B. Next rail wheels are lowered and the H-vehicle moves forward. The rail wheels' angled flange surfaces press against effective side rails created by a height difference 759 between flange support surfaces 756 and road wheel support surfaces 758A-B. This forces the H-vehicle into alignment as it moves through the gauge transition section 766 and onto rails 754A-B in the standard gauge section 768. Traction can be supplied by road wheels or rail wheels.

Optionally road wheels can be completely lifted off of rail tops and traction/breaking can be supplied by rail wheels.

A third set of sectional views 777A-B (A-A' and B-B') illustrates a wide-tread combination wheel sets with narrow flanges 783. In the wide gauge section, 777W, the road wheel tips can be supported by flange support surfaces 756B or the treads can be supported by the road wheel support surfaces 758A-B. In the standard gauge section, 777S the tread supports the wheels on the rails 754A-B.

A fourth set of sectional views 778A-B (A-A' and B-B') illustrates a narrow tread combination wheel with wide road wheel tip. Axle 784A with a pair of combination wheels is illustrated. The wheels need to be centered to mount rail wheel parts onto the rails 754A-B. In the wide gauge section 777W the road wheels tip is supported by flange support surfaces 756B. In the standard gauge section 777S the wheel's tread supports the H-vehicle on the rails 754A-B.

When moving from the road 752 to the transition span 751 the road wheel (flange) tip on the combination wheel makes a first contact with a transition span's flange support surface 756.

Thus, transition span 751 can support a variety of H-ve-hicle wheels with differing flange width and differing road wheel tip widths.

DESCRIPTION FIG. 8A

Figure 8A:
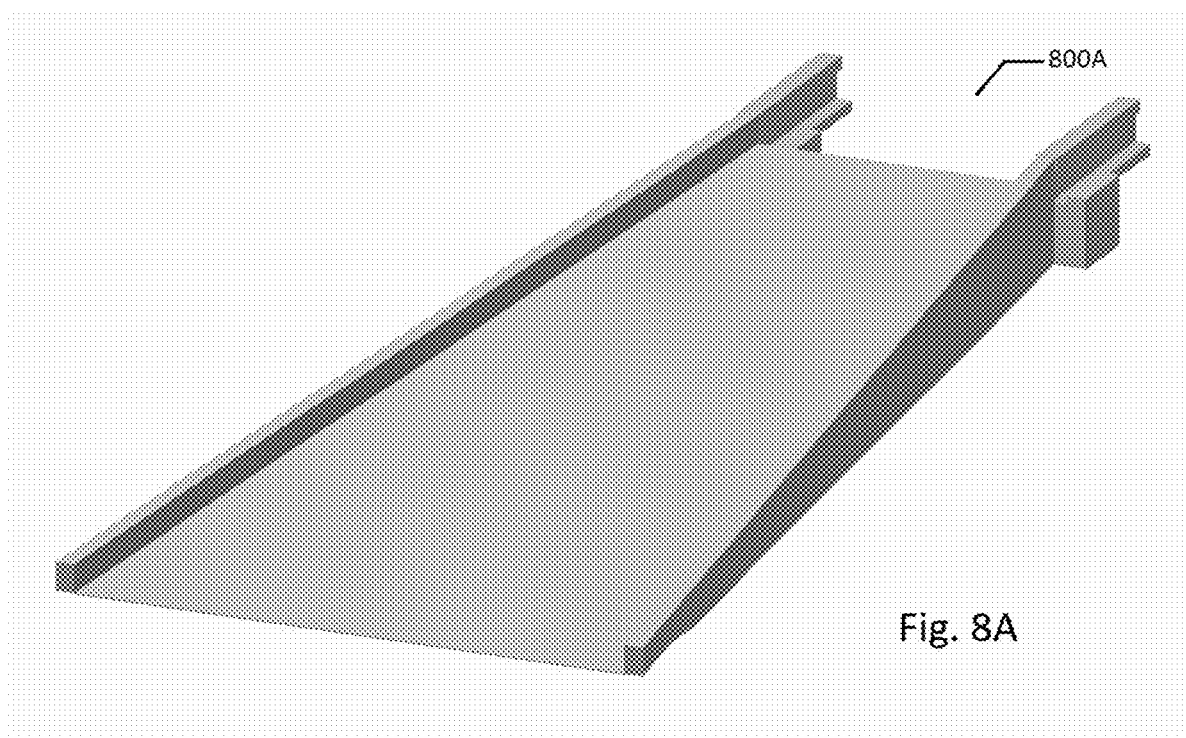
FIG. 8A is a perspective view of a transition span illustrated in FIG. 7B.

FIG. 8A is a perspective view 800A of the transition span illustrated in FIG. 7B. It may be used by all four wheeled vehicles. It may also be used by eight-wheeled vehicles, such as illustrated in FIG. 3B with the rail wheels lowered and providing traction. The upper right side of the transition span connects with a standard gauge rail and the lower left side to a road. The entrance gauge width may be wide, such as twice the rail gauge. The exit gauge width aligns with rails and can be a standard rail gauge. On both sides are side bars which may be contacted by the angled flange surfaces of combination wheels or rail-only wheels to force vehicle alignment towards the center.

This transition span may be used with human operator steering or electronically assisted e.g. as discussed in dis-cussion FIG. 7A.

DESCRIPTION FIG. 8B

Figure 8B:
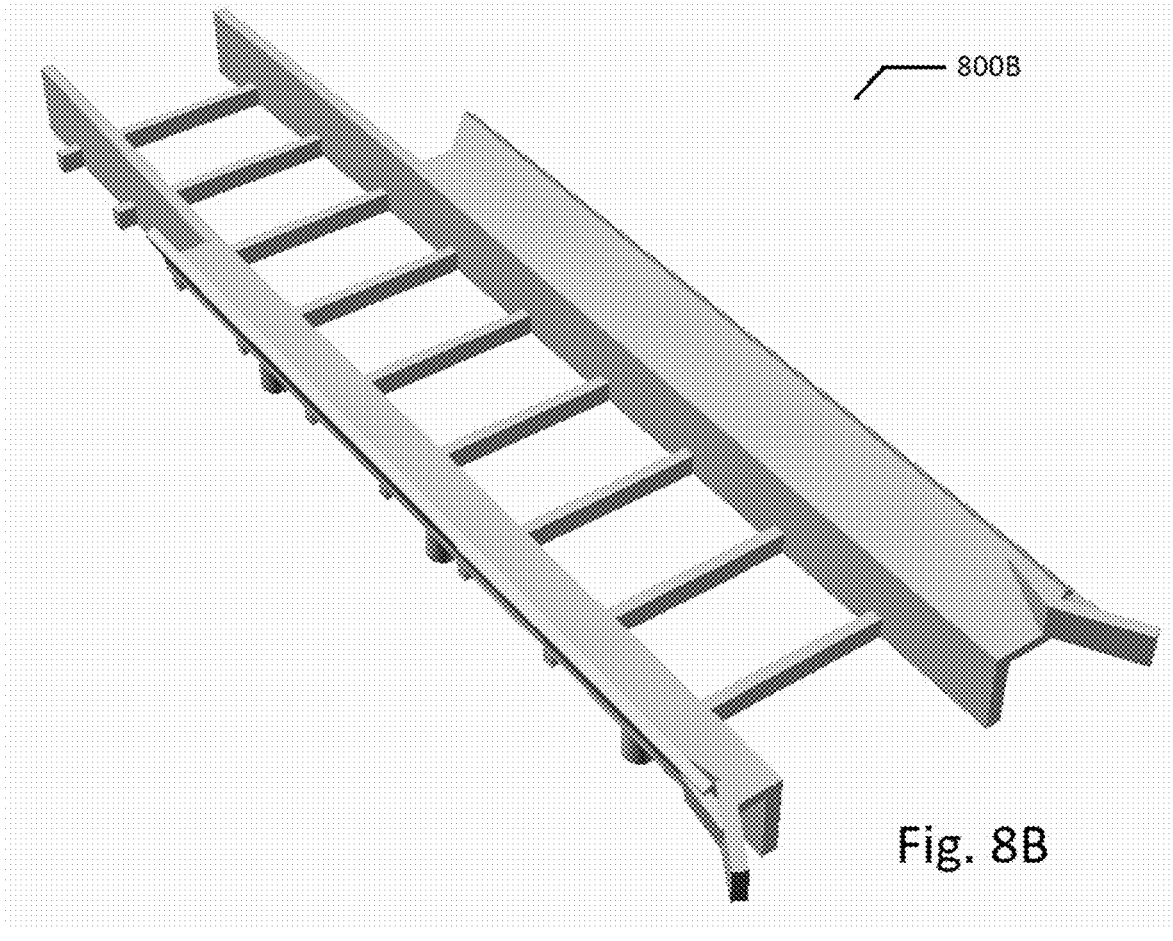
FIG. 8B is a perspective view of a transition span illustrated in FIG. 7C.

FIG. 8B is a perspective view 800B of a transition span illustrated in FIG. 7C. It may be used by all H-vehicles. The transition span's flange support surface, similar to item 756, is not illustrated (removed) to show ties (sleepers). The lower right side of the transition span is connected to a road side and the upper left side connects to a standard gauge rail.

The transition span allows eight wheeled H-vehicles illustrated in FIGS. 3B and 3D to enter from the road side and to switch between road travel and rail travel by lowering rail wheels. An H-vehicle going towards a rail can either lower rail wheels while on the transition span, or it can raise its road wheels. Four wheeled H-vehicles with combination wheels can enter the transition span from the road supported by road wheel tips on the flange support surface and exit said transition span supported by rail wheel treads on rail tops.

A transition span may have a gauge that starts wide for a vehicle mounting the transition span from the road, and then it narrows to a standard rail gauge as the vehicle moves towards a standard gauge rail. The transition span also features an optional gutter or side rail which may be angled. The gutter aligns the rail vehicle's wheels to approximately center the vehicle over the transition span. This compensates for imprecise or sloppy driving. Another optional feature is funnel bars (funnels) situated on the road side of the transition span. The funnel can be used to additionally align the road wheels going into the transition span. Optionally a roller with a vertical axis can be used in place of a funnel to contact wheels for better alignment. A ramp may be used on the road side to compensate for elevation changes, or the transition span may be tilted.

DESCRIPTION FIG. 9

Figure 9:
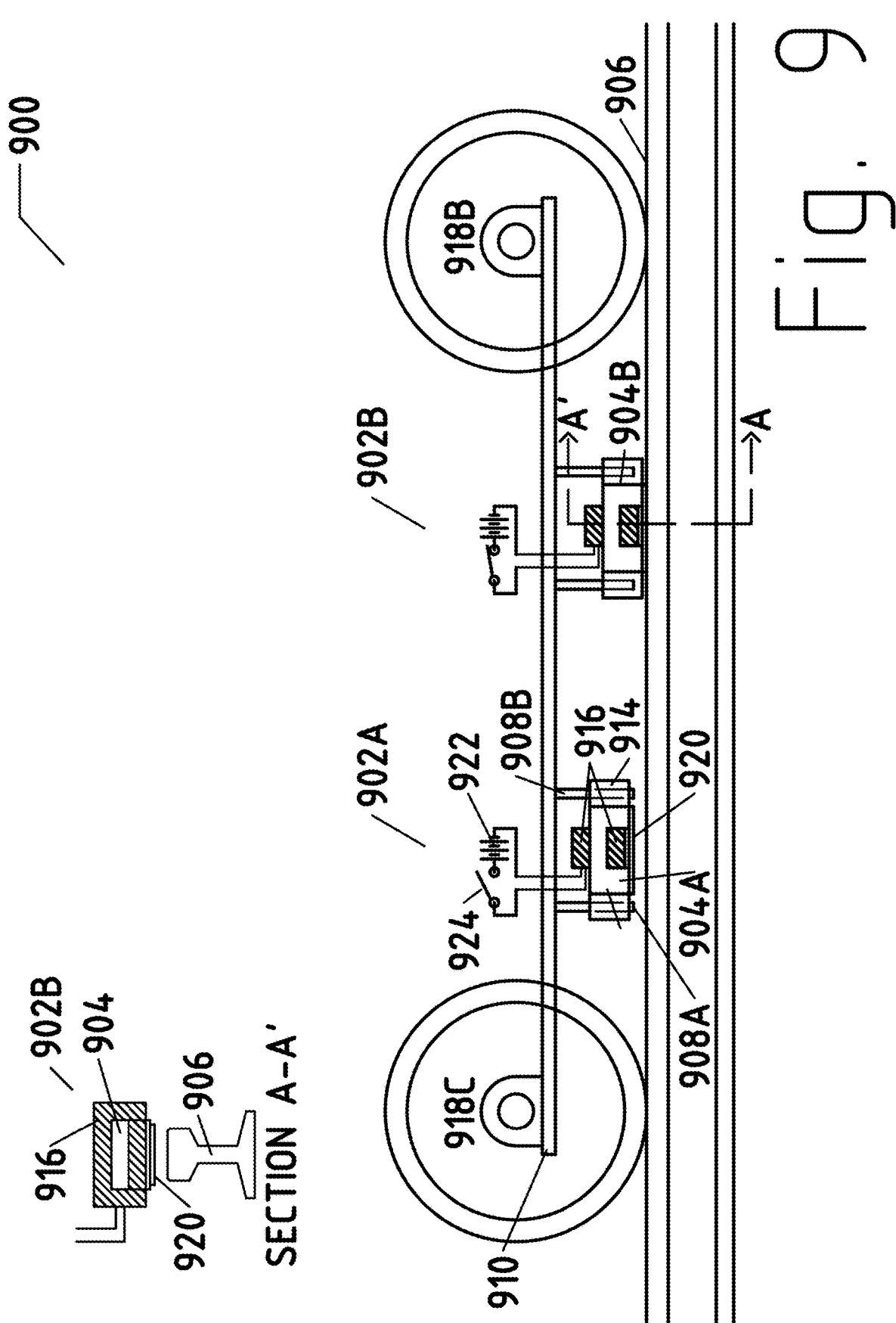
FIG. 9 are side and section view of an electromagnet rail brake.

FIG. 9 are side and section views 900 of a vehicle 910 with two electromagnet rail brakes 902A-B. The brake 902A illustrated on the left is de-energized and the brake on the right 904B is energized. This drawing illustrates electromagnets 904A-B with an inverted U-shaped ferrous core which are attracted to a ferrous rail 906 when electricity is applied to a coil 916. The coil's wire is illustrated with a hatch. The vehicle 910 has two rail wheels 918B-C illustrated. Two vertical slide pins 908A and 908B are attached to the chassis of the vehicle 910 and go into two guide holes in an electromagnet holder 914. The electromagnet holder is attached to and guides the electromagnet up or down towards the rail 906. The electromagnets 904A-B can slide up and down on slide pins, with an up-force being applied by a spring (not illustrated) and a down-force being applied by magnetic attraction between the ferrous rail and the electromagnet. Between the electromagnet and the rail 906 is a brake pad 920 that may use a friction surface that may be metallic, ceramic, or organic. The coil 916 on said electromagnet 904A-B is connected to a power source (battery) 922 and a switch 924. The power source may be AC or DC. When the electromagnet 904B is activated by closing said switch, the electromagnet 904B is pulled down by magnetic force, pinching the brake pad 920 between the electromagnet 904B and the rail 906, stopping the vehicle. Braking force may be increased with the application of more coil current. When the current is stopped, the electromagnet 904A is pulled up off the rail by spring force.

This electromagnet could only be energized in an emergency, but it could be used for normal operations. Normal operation may be while going downhill, preventing a runaway.

This brake can be used to supplement rail wheel braking on all rail vehicles, not just rail vehicles of the present invention. Excessive braking force could damage a rail or rail joints by stretching (tensile force). Brakes should not be applied over a rail gap.

DESCRIPTION FIG. 10

Figure 10:
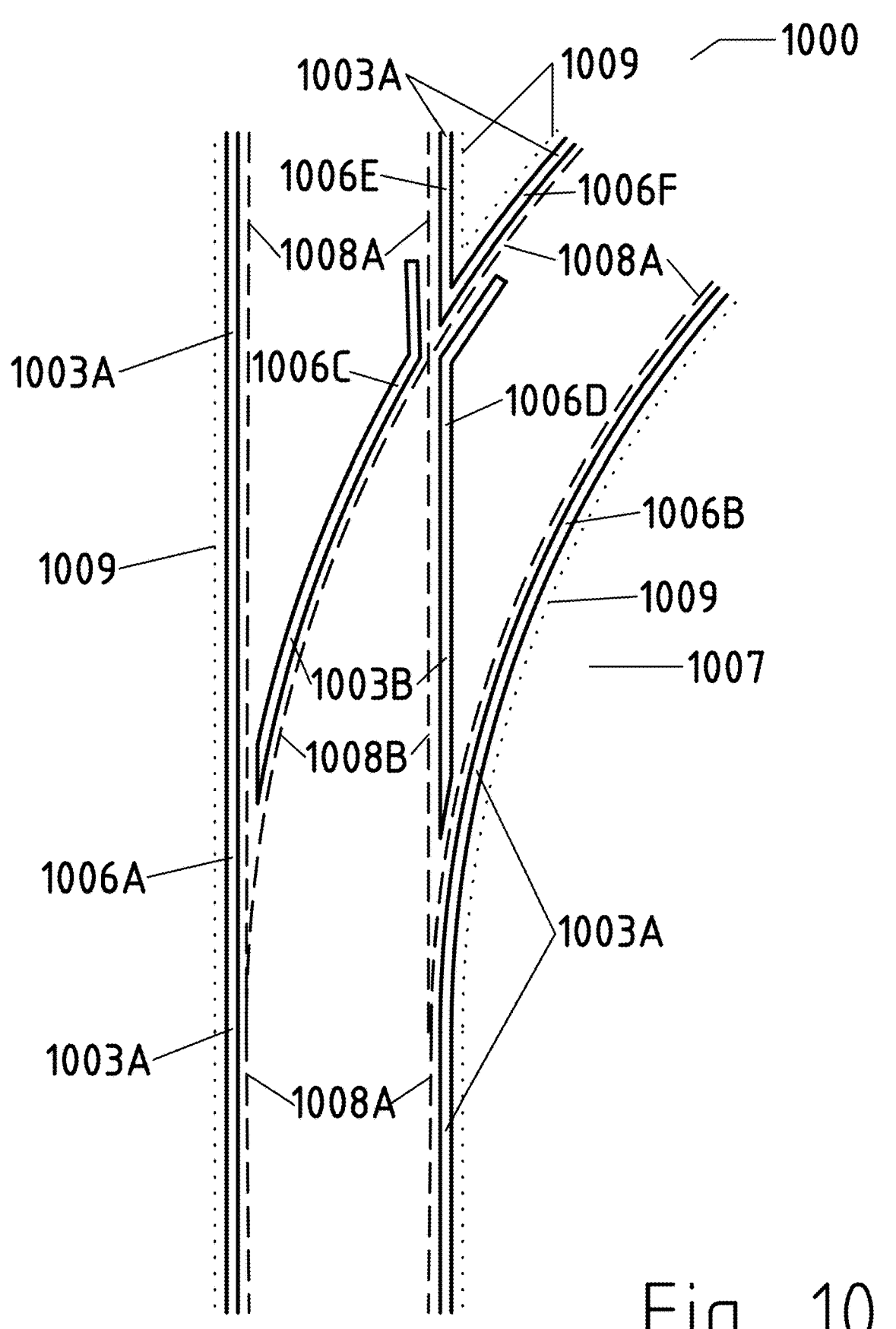
FIG. 10 is a top view of a passive rail junction that can be used by H-vehicles or R-vehicles with dual-flange rail wheels.

FIG. 10 is a top view 1000 of a passive rail junction 1007 that can be used by H-vehicles or R-vehicles with dual-flange rail wheels. These H-vehicles nominally have four road wheels plus four rail wheels, but only the rail wheels on one side of the vehicle are lowered to contact the rails, while the other two rail wheels on the opposite side are elevated. That is, while two dual-flange wheels on one side of a vehicle are lowered onto a rail for stabilization, the other two dual-flange wheels on the opposite side of the vehicle are raised above the opposite rail. The flanges on the dual-flange wheels are situated on both sides of a single rail while the rail wheel is lowered. While operating on the roads, all four rail wheels are elevated. This dual-flange H-vehicle can also travel on conventional rails and pass through conventional rail switches, provided the dual-flange rail wheels are lowered on the side of a direction of a turn.

This junction is similar to a junction illustrated in FIG. 2 of patent U.S. Pat. No. 11,364,940 but with additional outside flange paths 1009 situated on the outsides of the rails. Outside flange paths are illustrated as dotted lines and inside flange paths 1008A-B are illustrated as dashed lines. Normally these linear outside flange clearance spaces are empty, but there may be obstructions, such as grounding straps between rails or possibly lifted rail spikes. This H-vehicle uses a new method of applying lateral force to choose a route at a passive switch, which is contact of an outside rail wheel flange with an outside of a rail. This junction switching method can also be used for rail only (R-) vehicles that never leave the rails.

A junction 1007 is comprised of an alpha rail 1006A, a beta rail 1006B, an epsilon rail 1006E, and a zeta rail 1006F. A gamma rail 1006C and a delta rail 1006D are situated between the alpha rail 1006A and the beta rail 1006B and are designed to support the vehicle's road wheels. Rails 1006C and 1006F may be steel rails, but could also be made of concrete or metal plates, as they are not required to clear the flanges on the dual flange wheels. Rail top surfaces 1003A and 1003B are all essentially at a same height. Inside flange paths 1008A-B allow inside flange passage. Exterior flange paths 1009 allow outside flange passage. One flange on each dual flange wheel is situated inside a rail and one flange on each dual flange wheel is situated outside the same rail. In normal (non-switching) rail 855 travel the two guide dual flange rail wheels on one side of the vehicle will be elevated while the two guide wheels on the other side will be lowered.

This junction can also accommodate the hybrid vehicles or rail-only vehicles illustrated in FIGS. 3A and 3B but inside flange clearance paths 1008B are needed to accommodate single flange rail guide wheels.

The junction 1007 is a right turnout with one outgoing rail going straight and one outgoing rail turning right. This could as easily been illustrated as a left turnout or "Y" junction with both outgoing rails turning.

Dual-flange wheels are also used in an Abt funicular railroad, allowing a descending car to pass an ascending car on a single rail. Rail vehicles using only a single rail for guidance should be safer than using two rails for guidance because poor rail maintenance can allow the two rails to get out of tolerance, with the gauge being either too close or too far apart. Rail spacing tolerance is approximately a couple of inches (5 cm.) tolerance. A dimension out either way can cause a derailment.

An alternate embodiment to raise and lower rail wheels is anticipated. Front rail wheels and rear rail wheels can be mounted on common axles which pivot. The pivot axles axis are situated in the center of a vehicle and their axis is parallel to the direction of vehicle travel. When one wheel goes down, the one on the opposite side goes up.

DESCRIPTION FIG. 11

Figure 11:
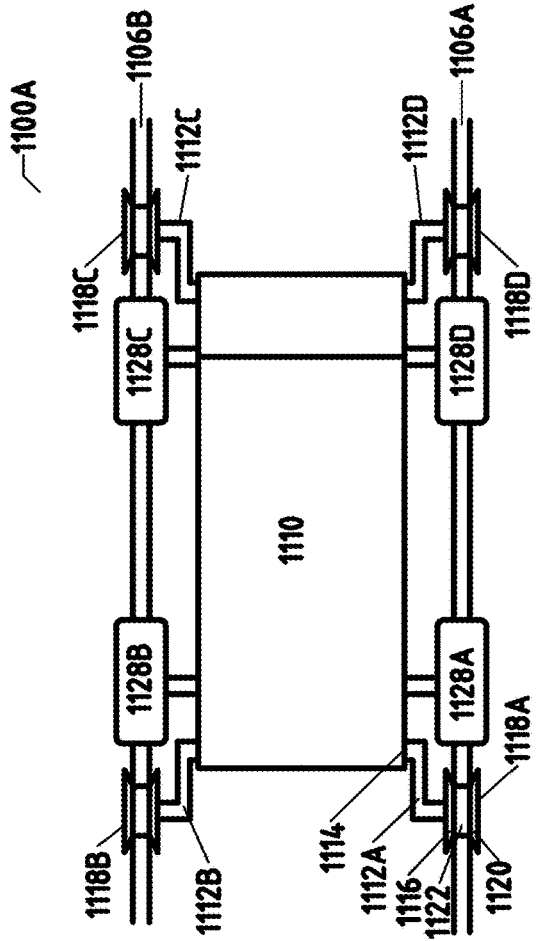
FIG. 11 is a top and side view of a vehicle with four dual-flange rail wheels situated above rails.
Figure 11:
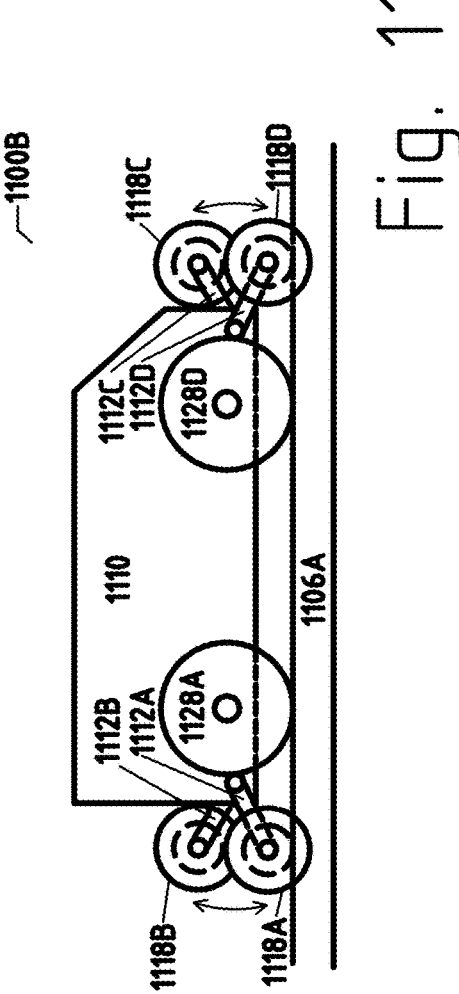

FIG. 11 is a top 1100A and side view 1100B of a vehicle 1110 with four dual-flange rail wheels 1118A-D situated above rails 1106A and 1106B. The vehicle is supported by road wheels 1128A-D which contact the tops of said rails. All four road wheels are contacting the rail tops for traction and support. The dual-flange rail wheels are comprised of an inside flange 1116, an outside flange 1120, and a tread 1122 (typ.). Rail wheels 1118B and 1118C are lifted above rail 1106B and rail wheels 1118A and 1118D are contacting the rail 1106A with the inside flanges sitting inside the rail 1106A and the outside flanges situated outside the rail 1106A. Rail wheels 1118A-D attach to one end of swing arms 1112A-D which are rotatably connected to the vehicle 1100 at point 1114 (typ.). Rotary actuators to raise and lower rail wheels are inside the vehicle and not illustrated. In a preferred embodiment, the actuators may operate independently but they may also operate in pairs with rails wheels on the right side of the vehicle being elevated while rail wheels on the left side of the vehicle are lowered.

In switching rail attachments, it is advisable for a vehicle to make contact on one side's rail before breaking contact with the other side's rail to avoid derailment. This is particularly important if the vehicle is in motion.

Steering may use two or four wheels and is most important for road travel. However, for rail travel using limited steering allows the vehicle to turn in a much tighter (smaller) radius. All types of steering are anticipated, including skid steering, Ackermann steering, rack and pinion steering, two and four wheel steering, and articulated steering. Rear and front road wheel sets and rail wheel sets may steer together, or one set only steers. Both road and wheel sets may remain fixed and not steer at all on the rails.

Sectional side view of FIG. 5B can also be used to construct a scale model using dual flange rail wheels, although elevated rail wheels on the distal side are not illustrated. Separate miniature RC servos were used on both ends of the model vehicle to raise rail wheels on one side (e.g. port) while lowering them on the other side (e.g. starboard).

DESCRIPTION FIG. 12

Figure 12:
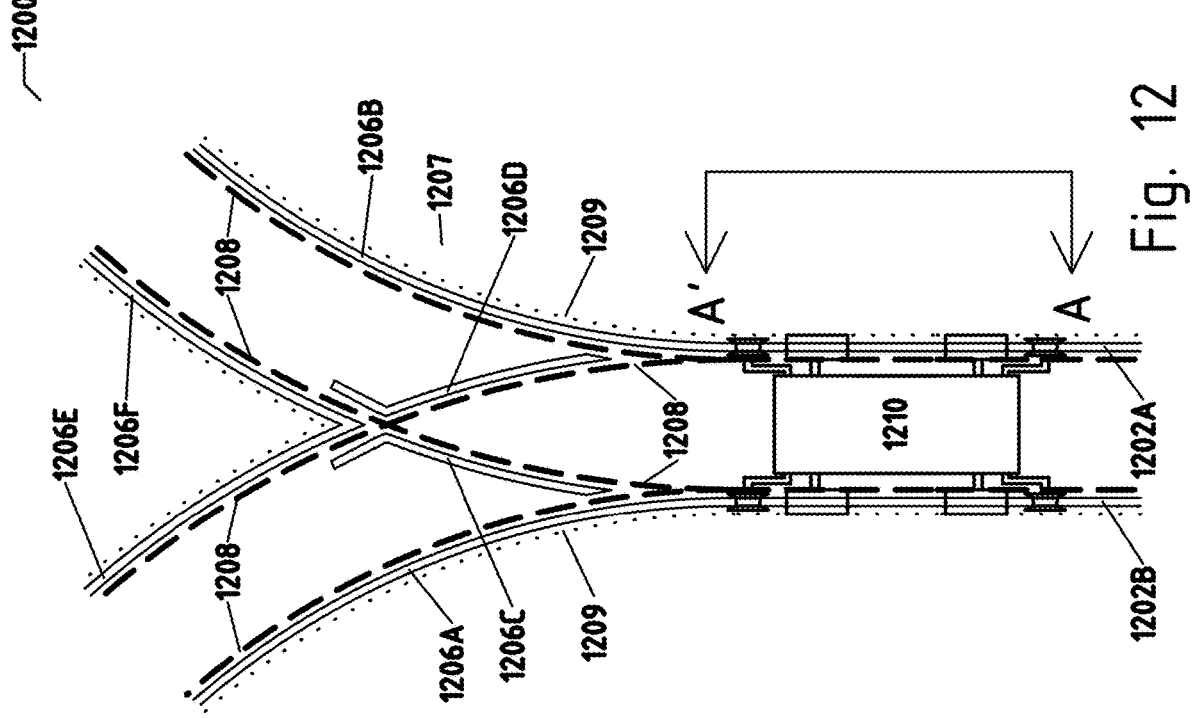
FIG. 12 is a top view of a vehicle situated on rails and approaching a junction

FIG. 12 is a top view 1200 of a vehicle 1210 situated on rails 1202A and 1202B and approaching a junction 1207. The junction consists of an alpha rail 1206A, a beta rail 1206B, an epsilon rail 1201E, and a zeta rail 1206F. A gamma rail 1206C and a delta rail 1206D may be rails or flat support surfaces. Vehicle 1210 in section A-A' can be viewed in FIG. 11, 1110B. The junction has inner flange clearance paths 1208 shown as a dashed line and outer flange clearance paths 1209 shown as a dotted line. The vehicle 1210 has its right dual-flange rail wheels down and its left dual-flange rail wheels up, so it will be making a right turn at junction 1207.

This rail junction 1207 can be placed into pavement similar to a trolley system (or a street car system). Furthermore, if a vehicle wants to switch from rail travel to road travel, it must only lift its rail wheels. On the other hand, switching from road travel to rail travel requires precision vehicle positioning before rail wheels are lowered. The motivation to build such a transit system is energy, safety and cost savings while traveling in rail mode.

Thus, a dual-flange rail wheel can produce lateral force using outside flanges on one side contacting an outside of a single rail.

DESCRIPTION FIG. 13

Figure 13:
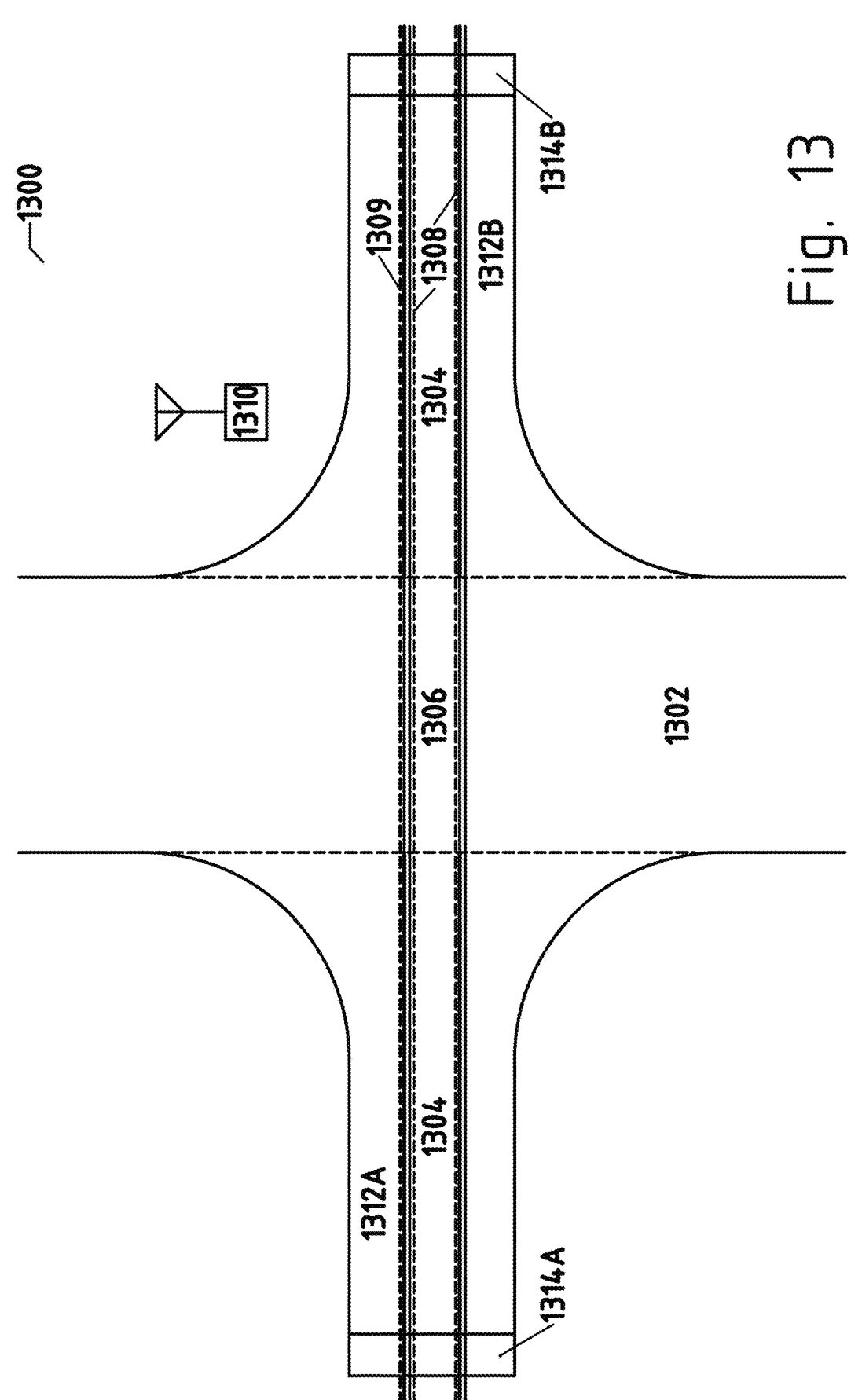
FIG. 13 is a top view of an intersection of a road and a pair of rails.

FIG. 13 is a top view 1300 of an intersection 1306 of a road 1302 and a pair of rails 1304. At this intersection, dual-mode H-vehicles mount and dismount the rail. For safety sake, there are paved turnout areas 1312A and 1312B where H-vehicles mount and dismount away from road traffic. The rail has an inner flange clearance paths 1308 and an outer flange clearance path 1309 on the top rail but only an inner flange clearance path on the bottom rail. This allows a single dual flange wheel to be lowered around the top rail. The lower flange clearance path is for backwards compatibility with legacy rolling stock. Optionally, outer flange clearance paths may be placed around both the top and bottom rails. The rail tops are approximately at a same height as road and turnout pavement.

A vehicle can drive onto the turnout and an automatic system can take control of vehicle positioning to lower dual-flange wheels onto the top rail. Any of the aforementioned location systems can be used to assist vehicle positioning. A Global Positioning System (GPS) differential transmitter 1310 sends out an offset signal informing said vehicle of the local GPS error. This differential signal reduces positioning error from about 4 meters to just a few centimeters. Either two or four wheel steering may be employed by the vehicle, and the flange clearance paths may be widened or the track's top with narrowed at mount locations to simplify alignment. Steering control can also be assisted with cameras, where the vehicle is positioned, one wheel is lowered, the vehicle is re-positioned and the second wheel on the same side of the vehicle is lowered.

Ramps 1314A and 1314B can alternately be used for mounting and dismounting the rails 1304. The use of up and down ramps allow this road-rail intersection to be compatible with four wheel vehicles using combination wheels, as illustrated in FIGS. 3C, 4C and 4D.

Alternate Embodiment, Features, Design Details and Advantages

1. A hybrid vehicle can mount a rail from a road crossing in the same way a conventional Hi-Rail vehicle mounts. This typically occurs where a road crosses the rail. Cameras, sensors and laser pointers can be used to facilitate manual or automatic alignment. This is not as safe, secure or quick as using a transition span. Instead of an abrupt drop-off at a road crossing, road edges in the road crossing can ramp down for vehicle alignment, forming a transition rail.
2. Any existing self-driving car technology can be used if appropriate. In particular parallel parking techniques can also be used to position a hybrid vehicle either over a rail at a road crossing or in the center of a transition span.
3. Vehicle wheel alignment with the rail is forced by moving the hybrid vehicle forward or backwards on the transition span as it narrows to standard gauge.
4. This invention can be used for model/toy or full scale applications. Any type of vehicle application is anticipated, such as no-operator delivery vehicles, trucks, trailers, buses, public and private vehicles, trucks and lorries. The hybrid vehicles can be owned by individuals and the rail may be public or private. It can be used for Personal Rapid Transit systems.

5. Dynamically variable traction and/or weight distribution on road or rail drive wheels can be used for better traction, lower rolling resistance or improved braking. For example, if the rail surface is slippery it may be advantageous to put more weight on a traction road wheel. If the rail surface is not slippery, it may be advantageous to lower rolling resistance by shifting the weight to a rail wheel.

6. Vehicle weight may be partially or fully borne by the rail wheels while on rails.

7. Steerable rail and road wheels allow tighter turning radius while on both roads and rails.

8. Travel over transition span can be made with or without the hybrid vehicle stopping.

9. It is dangerous to get outside of vehicles when mounting a rail, so automatic operation using sensors, cameras, computers and actuators is anticipated.

10. Vehicles may also back into a transition span.

11. A traffic control system (TCS) may control vehicle motion when mounting and exiting a transition span.

12. Road wheels may be any type, including wheels suitable for off-road.

13. Instead of road wheels, continuous track, also called tank tread or caterpillar track, can be employed.

14. Two closely spaced lasers may be used to check track for alignment. One laser reflects off of the top of the track and the other misses the track top when alignment is achieved. Three lasers can also be used to bracket a rail.

15. Grooves in a road can provide flange clearance. Pavement (or rails) adjacent to the grove can supply wheel support. Trolleys effectively use this type of track in streets.

16. As a design feature, the rail or road wheels can retract up underneath the body of the vehicle for aesthetics or improved aerodynamics.

17. Pairs of rail wheels may be situated in front of or behind road wheels, in front or middle of vehicle.

18. Either the rail wheels or the road wheels may be lifted.

19. Sensors can detect vehicle position in a transition span and signal an H-vehicle to drop rail wheels.

20. A golf cart chassis can be used for rail vehicle construction or hybrid vehicle construction. The width of a golf cart chassis allows room for combination wheels on 1435 mm. gauge track. This can make a low-cost demonstration system using abandoned track and a transition span.

21. Differential gears can be used to compensate for a problem of different right and left wheel speed, which is increased on tight corners. Alternately, the wheels may be driven independently, as by different traction motors.

22. Getting off of a set of rails is generally much easier than getting on because alignment is not required to lift the rail wheels, but alignment is required for dropping the rail wheels. Thus, a vehicle can just drive off of the end of a rail, the rails can sink into the pavement, or a vehicle can lift its rail wheels at a road crossing. The latter situation can occur when roads are paved over abandoned rail road tracks.

23. Other types of steering can be employed.

24. Other railway vehicle uses and configurations are anticipated.

25. Connecting vehicles, such as towed trailers or additional hybrid vehicles is anticipated. H- and R-vehicles can be used for towing. A road-rail trailer is given lateral force at junctions by a vehicle or animal pulling it in a desired direction.

26. Forming vehicles into trains is anticipated. A vehicle in the "train" can supply power or traction for the train vehicles. For example, batteries can be located in a towed rail vehicle, so instead of waiting for a battery recharge, a fresh battery vehicle can be exchanged. Tracks can supply power for traction and battery recharge.

27. Hybrid rail vehicles can also be used for switching yard operations or towing.

28. A vehicle with exceptionally narrow or wide road wheels that is going onto a transition span can communicate with a traffic control system that can adjust parameters on the transition span, such as gutter or funnel spacing. Likewise non-standard larger or smaller vehicles can be accommodated with different design transition spans. In other words, a transition span for a semi-trailer can be different than one for a compact car.

29. Vehicles entering or exiting a rail portion can enter a serial or parallel queue. A parallel queue allows emergency vehicles to go to a head of the queue.

30. A passive switch can also be called a Holtzman switch, or a "switchless switch". The latter seems like a contradiction. A conventional switch has moving blades doing the switching. The passive switch does not have moving blades.

31. Suspensions between the hybrid vehicle chassis and road/rail wheels are anticipated. The rail wheels may share a common suspension with the road wheels, or they may have a separate suspension.

32. A top of a steel rail can be "roughed-up" to improve traction, particularly when contacting a rubber wheel. For example, the top of the steel rail can be sandblasted or knurled. Contact with a steel rail wheel will wear down the roughed-up area, but that can have only a slight effect with a rubber road wheel because the rubber wheel will make contact with a greater area of the rail than a steel rail wheel. Roughed-up rails can be used for steep inclines. Sand can also be used to improve traction, particularly for steep inclines or icy conditions.

33. For-hire vehicles can be summoned with cell phone apps.

34. All inventions applying to self-driving cars and other vehicles also apply to hybrid rail vehicles both on and off rail.

35. In areas where heavy snowfall or ice is prevalent, it is good practice to put a cover over the transition span keeping the rails clear, similar to covered bridges.

36. A wire can be planted in a path leading up to a transition span. A current can be passed through the wire at a high audio frequency and the magnetic field can be picked up by a vehicle being directed onto a transition span. Utilities use this technology to locate underground conductors, such as telephone or power lines. Different frequencies can be used to guide to different transition spans.

37. Other methods to align a hybrid vehicle in a transition span include lowering guide pins or rollers from a vehicle to go into grooves in a floor of transition span. The groove width narrows as the vehicle moves towards the rails to force alignment.

38. Three way turnouts can also be passive junctions

39. Machine vision system can also be used for on-track steering. The vision system see a track curve ahead and steer into it. GPS coordinates can be used with a memory system to know track curves for different latitude and longitude coordinates.

40. Rubber driveshafts or torsion springs can be used on combination wheels to avoid skidding.

41. Vehicles may operate underground, at grade or elevated.

42. Breaking can be improved by placing a u-shaped electromagnet over the track with a thin brake pad between track and electromagnet. When electric current is applied, it pulls the electromagnet to the track and the brake pad in the middle gets pinched, causing friction, stopping the vehicle faster.

43. In areas with steep inclines, floors can be provided between rails. Vehicles' road wheels can contact a floor for traction. On a steep hill the junction floor may rise up to provide better traction with road wheels than would be provided with rail wheels on rails. Also traction assist devices, such as road tire studs, can improve traction in icy weather.

44. There are also bicycle, tricycle, and motorcycle hybrid vehicle applications. They may be human powered, human assist, or fully powered.

45. Hybrid semi-tractor trailer applications can save road damage. Semi-trailer wheels are converted to combination wheels by an attachment of a hub cap rail wheel using a wide or narrow tread.

46. Side rollers can be used in addition to steering to provide lateral force. This may be important when traction is poor.

47. Another method of transitioning from rail travel to or from road travel is to change out the four rail wheels (e.g. steel) for road wheels (e.g. rubber). The time required to make the change limits applications.

48. On a combination wheel, road wheels and rail wheels can be concentric, and then made non-concentric using a swing arm.

49. Standard wheels on most cars can be exchanged for combination wheels to make an H-vehicle, provided the track gauge fits. Most cars on the roads today have approximately a same width.

50. A Traffic Control System (TCS) can employ fiber optic lines which follow the tracks. The use of fiber optic lines provides high reliability, and radio frequency communications with vehicles and be accomplished with millimeter wave signals. A R- or H-vehicle can provide a mobile Wi-Fi hot spot for providing internet connectivity for passengers' devices.

51. Personal Rapid Transit systems can be built for bidirectional service with a sausage-like rail construction. That is, all tracks are one-way but frequent turnarounds allow a traveler to get in a vehicle on a one-way track and, in a short distance, make a U-turn travel towards a desired destination. Thus, a track can go East on one side of a street and go West on the opposite side of the street.

52. Polyurethane may be used for rail wheels where noise or weight is a factor. Also a short circuit between tracks will cause a rail crossing gate to descend, and non-conducting wheels prevent the short circuit, if that operation is desired.

53. Using vehicles with dual flange rail wheels and road wheels, a point-to-point railroad system, such as the system illustrated in FIG. 1C, can be built. The use of a single rail on one side and a support surface on the other side can be built for a cost savings, although pavement support surfaces can have higher rolling resistance relative to rails. The single rail uses flange clearance paths on both sides. Such a system could be built along existing highways with the rail situated on an edge of the road and the support surface being existing pavement in the road or on a road's shoulder.

What I claim is:

1. A hybrid vehicle configured for use on roads and on rails, and configured to transition the hybrid vehicle, at an intersection of a standard road and a standard gauge rail system, between (i) a road mode for traveling on the standard road, and (ii) a rail mode for traveling on at least one standard rail of the intersecting standard gauge rail system, the hybrid vehicle comprising:

a vehicle body;

at least one pair of road wheels including (i) a first road wheel disposed toward a front of the hybrid vehicle with respect to a direction of travel of the vehicle, and (ii) a second road wheel disposed toward a rear of the hybrid vehicle, such that the first and second road wheels will be substantially in alignment along the direction of travel when the vehicle is moving straight along the direction of travel;

first and second pairs of rail wheels, wherein each rail wheel pair of the first and second rail wheel pairs includes (i) a front dual-flange rail wheel disposed toward the front of the hybrid vehicle with respect to the direction of travel, and (ii) a rear dual-flange rail wheel disposed toward the rear of the hybrid vehicle with respect to the direction of travel; and a guidance system configured to align at least one dual-flange rail wheel of the first and second pairs of rail wheels with the at least one standard rail when the hybrid vehicle transitions from the road mode to the rail mode, wherein the first and second rail wheel pairs disposed opposite one another along starboard and port sides of the hybrid vehicle, respectively, such that (i) the first rail wheel pair is configured to vertically raise from, and lower to, the at least one standard rail on the starboard side, and (ii) the second rail wheel pair is configured to vertically raise from, and lower to, the at least one standard rail on the port side, wherein the first and second rail wheel pairs are further configured to operate independently of one another in the vertical direction, such that one of the first and second rail wheel pairs may be raised from the at least one standard rail while the other of the first and second rail wheel pairs is lowered to the at least one standard rail, wherein each dual-flange rail wheel of the first and second rail wheel pairs includes:

a rail wheel tread (i) configured to bear a weight of the hybrid vehicle when lowered upon the at least one standard rail, and (ii) having a tread width greater than a rail width of an entire upper surface of the at least one standard rail; and inner and outer rail wheel flanges (i) fixed to and extending outwardly from the rail wheel tread vertically and horizontally, and (ii) disposed opposite one another across the rail wheel tread such that the rail wheel tread and the inner and outer rail wheel flanges collectively form a weight-bearing concave shape capable of enveloping the entire upper surface of the at least one standard rail when lowered thereupon.

2. The hybrid vehicle of claim 1, wherein the at least one pair of road wheels includes a starboard road wheel pair and a port road wheel pair configured to vertically raise and lower independently of one another.

3. The hybrid vehicle of claim 2, wherein the starboard road wheel pair is further configured to vertically raise when the starboard rail wheel pair is lowered, and wherein the port road wheel pair is further configured to vertically raise when the port rail wheel pair is lowered.

4. The hybrid vehicle of claim 2, wherein the first rail wheel pair is further configured to bear the hybrid vehicle weight on the starboard side, and wherein the port road wheel pair is further configured to simultaneously bear the hybrid vehicle weight on a road surface of the standard road disposed on the port side of the standard rail system and running parallel to the at least one standard rail, such that hybrid vehicle may simultaneously operate in partial road mode and partial rail mode.

5. The hybrid vehicle of claim 2, wherein the second rail wheel pair is further configured to bear the hybrid vehicle weight on the port side, and wherein the starboard road wheel pair is further configured to simultaneously bear the hybrid vehicle weight on a road surface of the standard road disposed on the starboard side of the standard rail system and running parallel to the at least one standard rail, such that hybrid vehicle may simultaneously operate in partial road mode and partial rail mode.

6. The hybrid vehicle of claim 1, wherein the at least one standard rail includes a pair of standard rails running substantially parallel to one another and separated by a track width therebetween corresponding to a standard track gauge.

7. The hybrid vehicle of claim 6, wherein the standard track gauge is one of a full scale gauge and a small model gauge, and wherein the hybrid vehicle has a size corresponding to the standard track gauge.

8. The hybrid vehicle of claim 7, wherein an outer flange span is defined as a distance between an outermost point of the outer rail wheel flange of the front dual-flange rail wheel of the first rail wheel and an outermost point of the outer rail wheel flange of the front dual-flange rail wheel of the second rail wheel, and wherein the outer flange span is configured to be greater than an outward deviation of the track width.

9. The hybrid vehicle of claim 7, wherein an inner flange span is defined as a distance between an outermost point of the inner rail wheel flange of the front dual-flange rail wheel of the first rail wheel and an outermost point of the inner rail wheel flange of the front dual-flange rail wheel of the second rail wheel, and wherein the inner flange span is configured to be less than an inward deviation of the track width.

10. The hybrid vehicle of claim 1, wherein the standard road and the standard rail system at least one of (i) cross one another, (ii) run substantially parallel to one another, (iii) intersect substantially perpendicular to one another, and (iv) include a vehicle turnout area connected to the standard road and the standard rail system.

11. The hybrid vehicle of claim 1, wherein the hybrid vehicle is further configured to elevate all dual-flange rail wheels when traveling in road mode.

12. The hybrid vehicle of claim 1, wherein the guidance system is configured for passive mechanical alignment of the at least one dual-flange rail wheel with the at least one standard rail.

13. The hybrid vehicle of claim 1, wherein the guidance system includes electronic positioning means including at least one of a GPS differential transmitter, machine vision, LIDAR, digital signal processing, magnetic field detection, and a microwave transceiver.

14. A rail vehicle configured for selective guiding among two rails of a standard rail system, the rail vehicle comprising:

a vehicle body having, with respect to a direction of travel along the two rails, (i) a starboard side, (ii) a port side, (iii) a vehicle front portion, and (iv) a vehicle rear portion;

a first pair of rail wheels having a first front rail wheel disposed on the starboard side toward the vehicle front portion, and a first rear rail wheel disposed on the starboard side toward the vehicle rear portion;

a second pair of rail wheels having a second front rail wheel disposed on the port side toward the vehicle front portion, and a second rear rail wheel disposed on the port side toward the vehicle rear portion;

wherein the first pair of rail wheels is configured to vertically raise from, and lower to, a starboard rail of the two rails, and wherein the second pair of rail wheels is configured to vertically raise from, and lower to, a port rail of the two rails, and wherein the first pair of rail wheels is configured to raise and lower independently of the second pair of rail wheels, wherein the first and second front rail wheels are configured to pivot independently of the first and second rear rail wheels, and wherein each rail wheel of the first and second rail wheel pairs includes a concave dual-flange rail wheel including:

a rail wheel tread (i) configured to bear a weight of the rail vehicle when lowered upon the starboard or the port rail, and (ii) having a tread width greater than a rail width of an entire upper surface of the respective starboard or port rail; and inner and outer rail wheel flanges (i) fixed to and extending outwardly from the rail wheel tread vertically and horizontally, and (ii) disposed opposite one another across the rail wheel tread, wherein the rail wheel tread and the inner and outer rail wheel flanges collectively form a weight-bearing concave shape capable of enveloping an entire upper surface of the respective starboard or port rail when lowered thereupon, wherein each outer rail wheel flange is configured to apply an inward lateral force against the starboard or port rail when lowered thereupon.

15. The rail vehicle of claim 14, configured to guide against an outer edge of the starboard rail by lowering the first pair of rail wheels and raising the second pair of rail wheels.

16. The rail vehicle of claim 14, configured to guide against an outer edge of the port rail by lowering the second pair of rail wheels and raising the first pair of rail wheels.

17. The rail vehicle of claim 14, wherein the two rails are sized and spaced apart according to a standard track gauge of approximately 1435 mm, and wherein the rail vehicle is a full scale vehicle.

18. The rail vehicle of claim 14, wherein the two rails are sized and spaced apart according to a model-scale track gauge, and wherein the rail vehicle is a model vehicle sized to correspond with the model-scale track gauge.

19. A method of steering a hybrid vehicle from a standard road onto a standard rail at an intersection thereof, the hybrid vehicle including a plurality of road wheels and a plurality of vertically moveable concave dual-flange rail wheels, the method comprising;

positioning the hybrid vehicle above the standard rail at the intersection;

guiding, using the road wheels, a first dual-flange rail wheel of the plurality of vertically moveable concave dual-flange rail wheels directly above the standard rail, such that the first dual-flange rail wheel is aligned with a rail upper surface of the standard rail to position first inner and outer flanges of the first dual-flange rail wheel around the rail upper surface;

lowering the first dual-flange rail wheel onto the rail upper surface of the standard rail such that (i) a first rail wheel tread of the first dual-flange rail wheel, disposed between the first inner and outer flanges, bears a weight of the hybrid vehicle on the rail upper surface, and (ii) an entirety of the rail upper surface of the standard rail is enveloped between the first inner and outer flanges;

steering the hybrid vehicle to align a second dual-flange rail wheel of the plurality of vertically moveable concave dual-flange rail wheels with a direction of the standard rail; and lowering the second dual-flange rail wheel onto the standard rail such that (i) a second rail wheel tread of the second dual-flange rail wheel bears the weight of the hybrid vehicle, and (ii) the entirety of the rail upper surface of the standard rail is enveloped between second inner and outer flanges extending outwardly and away from the second rail wheel tread.

20. The method of claim 19, wherein the standard road and the standard rail at least one of (i) cross one another, (ii) run substantially parallel to one another, (iii) intersect substantially perpendicular to one another, and (iv) include a vehicle turnout area connected to the standard road and the standard rail.

\* \* \* \* \*